United States Patent
Bonnell et al.

(10) Patent No.: US 11,533,178 B2
(45) Date of Patent: Dec. 20, 2022

(54) METHODS AND SYSTEMS FOR DATA AUTHENTICATION SERVICES

(71) Applicant: United States Postal Service, Washington, DC (US)

(72) Inventors: Clayton C. Bonnell, Fairfax, VA (US); Kelley A. Sullivan, Washington, DC (US)

(73) Assignee: United States Postal Service, Washington, DC (US)

(*) Notice: Subject to any disclaimer, the term of this patent is extended or adjusted under 35 U.S.C. 154(b) by 304 days.

(21) Appl. No.: 16/197,226

(22) Filed: Nov. 20, 2018

(65) Prior Publication Data

US 2019/0156380 A1    May 23, 2019

Related U.S. Application Data

(62) Division of application No. 15/066,945, filed on Mar. 10, 2016.

(Continued)

(51) Int. Cl.
*H04L 9/32* (2006.01)
*G06Q 30/02* (2012.01)
(Continued)

(52) U.S. Cl.
CPC .............. *H04L 9/32* (2013.01); *B07C 1/00* (2013.01); *G06Q 20/102* (2013.01);
(Continued)

(58) Field of Classification Search
None
See application file for complete search history.

(56) References Cited

U.S. PATENT DOCUMENTS 4,868,757 A * 9/1989 Gil .................. G07B 17/00467
400/82
5,062,645 A * 11/1991 Goodman ............. A63F 3/0478
273/249

(Continued)

FOREIGN PATENT DOCUMENTS

EP    2146282 A2 * 1/2010 ........... G06F 9/5077
EP    2916520 A1    9/2015
(Continued)

OTHER PUBLICATIONS

Ming-I Hsieh, Hsia o-hang Wu (Secure Electronic Post Office) (Year: 2000).*

(Continued)

*Primary Examiner* — Mamon Obeid
(74) *Attorney, Agent, or Firm* — Knobbe Martens Olson & Bear LLP

(57) ABSTRACT

Methods and systems for electronic document authentication are disclosed. In one aspect, a method of generating an electronic postmark includes receiving, via a server, a request message from an electronic network, the request message comprising request data including payload data and meta data, generating a timestamp in response to receiving the message, hashing the payload data to generate a payload hash, digitally signing the metadata, the payload hash, and the timestamp to generate a digital signature, generating a response message, the response message generated to comprise the metadata, the payload hash, the timestamp, and the digital signature; and transmitting the response message onto the electronic network.

13 Claims, 15 Drawing Sheets

Related U.S. Application Data

(60) Provisional application No. 62/133,173, filed on Mar. 13, 2015.

(51) Int. Cl.
*G06Q 20/38* (2012.01)
*G06Q 20/10* (2012.01)
*G06Q 50/32* (2012.01)
*B07C 1/00* (2006.01)

(52) U.S. Cl.
CPC ..... *G06Q 20/3827* (2013.01); *G06Q 30/0283* (2013.01); *G06Q 50/32* (2013.01); *G06Q 2220/00* (2013.01); *G06Q 2250/05* (2013.01); *G06Q 2250/30* (2013.01); *G06Q 2250/60* (2013.01); *G06Q 2250/905* (2013.01)

(56) References Cited

U.S. PATENT DOCUMENTS

| | | | | |
|---|---|---|---|---|
| 5,699,257 | A * | 12/1997 | Emmett | G07B 17/00508 400/159 |
| 6,088,717 | A * | 7/2000 | Reed | H04L 67/02 709/212 |
| 6,333,917 | B1 * | 12/2001 | Lyon | H04L 43/10 370/252 |
| 6,523,012 | B1 * | 2/2003 | Glassman | G06Q 20/06 705/75 |
| 6,529,908 | B1 * | 3/2003 | Piett | G06F 16/95 707/999.102 |
| 7,121,455 | B2 * | 10/2006 | Chamberlain | H04L 63/12 235/382 |
| 7,779,481 | B2 * | 8/2010 | Chamberlain | G06Q 10/10 726/28 |
| 7,797,543 | B1 * | 9/2010 | Campbell | H04L 63/123 713/181 |
| 7,831,518 | B2 * | 11/2010 | Montgomery | G07B 17/00508 705/401 |
| 7,840,414 | B1 * | 11/2010 | Parenti | G06Q 10/08 705/1.1 |
| 8,042,163 | B1 | 10/2011 | Karr et al. | |
| 8,401,522 | B2 | 3/2013 | Crawford et al. | |
| 8,423,437 | B2 * | 4/2013 | Benisti | H04L 63/10 713/170 |
| 9,516,470 | B1 * | 12/2016 | Scofield | G01C 21/3697 |
| 9,525,972 | B2 * | 12/2016 | Raounak | H04W 12/069 |
| 9,531,707 | B1 * | 12/2016 | Daniel | H04L 63/0861 |
| 9,866,544 | B2 * | 1/2018 | Raounak | H04W 4/023 |
| 10,075,847 | B1 * | 9/2018 | Moreton | H04L 63/107 |
| 2002/0029248 | A1 * | 3/2002 | Cook | H04L 63/0823 705/26.1 |
| 2002/0116227 | A1 | 8/2002 | Dick | |
| 2003/0065626 | A1 | 4/2003 | Allen | |
| 2003/0101143 | A1 * | 5/2003 | Montgomery | G07B 17/00435 705/62 |
| 2003/0101147 | A1 * | 5/2003 | Montgomery | G07B 17/00024 705/402 |
| 2003/0101148 | A1 * | 5/2003 | Montgomery | G07B 17/00508 705/401 |
| 2004/0034780 | A1 * | 2/2004 | Chamberlain | H04L 63/123 713/178 |
| 2004/0064423 | A1 * | 4/2004 | Rozendaal | G06Q 20/102 705/401 |
| 2005/0018167 | A1 * | 1/2005 | Maria Hennus | G03F 7/70716 430/22 |
| 2005/0033993 | A1 * | 2/2005 | Cooper | G06F 21/31 726/19 |
| 2005/0177504 | A1 * | 8/2005 | Crosson Smith | G06Q 20/40 705/40 |
| 2005/0278264 | A1 * | 12/2005 | Jacobson | G07B 17/00661 705/407 |
| 2006/0021018 | A1 * | 1/2006 | Hinton | H04L 63/0815 726/10 |
| 2006/0231607 | A1 * | 10/2006 | Chamberlain | H04L 63/12 235/375 |
| 2007/0072564 | A1 * | 3/2007 | Adams | G06Q 10/107 455/115.1 |
| 2007/0118603 | A1 * | 5/2007 | Washburn | H04L 67/53 709/206 |
| 2007/0174215 | A1 * | 7/2007 | Morel | B41J 13/14 705/410 |
| 2007/0236749 | A1 * | 10/2007 | Henry | H04N 1/00214 358/402 |
| 2008/0103979 | A1 * | 5/2008 | Chatte | G07B 17/00661 705/62 |
| 2008/0104411 | A1 * | 5/2008 | Agrawal | H04L 63/0846 726/6 |
| 2008/0109651 | A1 * | 5/2008 | Duda | H04L 9/3247 713/153 |
| 2009/0103702 | A1 * | 4/2009 | Allen | H04L 63/0823 379/142.04 |
| 2009/0132490 | A1 * | 5/2009 | Okraglik | H04L 51/42 |
| 2009/0158404 | A1 * | 6/2009 | Hahn | H04L 63/083 726/5 |
| 2009/0259840 | A1 * | 10/2009 | Campbell | H04L 9/3247 713/155 |
| 2010/0122212 | A1 | 5/2010 | Boudalier | |
| 2010/0293111 | A1 * | 11/2010 | Van Gorp | B07C 3/006 705/402 |
| 2011/0029459 | A1 * | 2/2011 | Schneider | G06Q 20/10 705/408 |
| 2011/0035337 | A1 * | 2/2011 | Choi | G07B 17/00508 235/375 |
| 2012/0232970 | A1 * | 9/2012 | Kara | G07B 17/00024 705/408 |
| 2013/0013921 | A1 * | 1/2013 | Bhathena | H04L 63/045 713/168 |
| 2013/0036458 | A1 | 2/2013 | Liberman et al. | |
| 2013/0117507 | A1 * | 5/2013 | Chiang | G06F 12/0866 711/E12.001 |
| 2013/0198060 | A1 * | 8/2013 | Whitehouse | G06Q 20/22 705/333 |
| 2013/0198824 | A1 | 8/2013 | Hitchcock et al. | |
| 2013/0297931 | A1 * | 11/2013 | Campbell | H04L 9/3247 713/176 |
| 2014/0109206 | A1 * | 4/2014 | Goel | H04L 63/20 726/6 |
| 2014/0189808 | A1 | 7/2014 | Mahaffey et al. | |
| 2014/0258098 | A1 * | 9/2014 | Felix | G06Q 20/00 705/331 |
| 2014/0331282 | A1 | 11/2014 | Tkachev | |
| 2015/0067338 | A1 * | 3/2015 | Gero | H04L 9/3263 713/171 |
| 2015/0076043 | A1 * | 3/2015 | Serjeantson | B07C 7/005 209/584 |
| 2015/0095352 | A1 * | 4/2015 | Lacey | G06F 21/6218 707/752 |
| 2015/0096813 | A1 * | 4/2015 | Aumente | G07B 15/00 177/245 |
| 2015/0183783 | A1 * | 7/2015 | Chan | C07D 471/04 560/103 |
| 2015/0244687 | A1 | 8/2015 | Perez et al. | |
| 2015/0256973 | A1 * | 9/2015 | Raounak | H04W 12/069 726/7 |
| 2015/0287113 | A1 * | 10/2015 | Dearing | G06Q 30/0611 705/26.4 |
| 2016/0018253 | A1 * | 1/2016 | O'Neil | G01G 19/4144 177/25.13 |
| 2016/0073019 | A1 * | 3/2016 | Nowicki | G01G 21/28 348/135 |
| 2016/0140493 | A1 * | 5/2016 | Dixon | G06Q 10/0833 705/26.81 |
| 2016/0173501 | A1 | 6/2016 | Brown | |
| 2016/0228922 | A1 * | 8/2016 | Snead | B07C 3/18 |
| 2016/0267558 | A1 * | 9/2016 | Bonnell | G06Q 30/0283 |
| 2016/0300187 | A1 * | 10/2016 | Kashi | G06Q 10/0832 |
| 2016/0371438 | A1 * | 12/2016 | Annulis | G06F 21/32 |
| 2017/0063829 | A1 * | 3/2017 | Raounak | H04W 12/069 |
| 2017/0068784 | A1 * | 3/2017 | Sullivan | G16H 10/60 |

(56) References Cited

U.S. PATENT DOCUMENTS

| | | | |
|---|---|---|---|
| 2017/0140174 A1 | 5/2017 | Lacey et al. | |
| 2017/0187701 A1* | 6/2017 | Bonnell | H04L 63/08 |
| 2017/0264777 A1* | 9/2017 | Irons | H04N 1/32149 |
| 2017/0331818 A1* | 11/2017 | Kader | H04L 63/0853 |
| 2018/0060535 A1 | 3/2018 | Reicher | |
| 2018/0091493 A1* | 3/2018 | Raounak | H04L 63/107 |
| 2018/0329903 A1* | 11/2018 | Irons | G06F 3/1204 |
| 2019/0045077 A1* | 2/2019 | Irons | G06F 16/93 |
| 2021/0241270 A1* | 8/2021 | Raevsky | G06Q 20/385 |
| 2021/0319441 A1* | 10/2021 | Knobel | G06Q 20/36 |
| 2022/0222243 A1* | 7/2022 | Pierce | G06F 21/64 |

FOREIGN PATENT DOCUMENTS

| | | | |
|---|---|---|---|
| JP | | 5377494 B2 | 12/2013 |
| WO | WO 2015/183783 A1 | | 12/2015 |

OTHER PUBLICATIONS

Barcode, Package, Intelligent Mail (Year: 2011).*

Setlur et al (Truthing, Testing and Evaluation Issues in Complex Systems) (Year: 2001).*

International Search Report and Written Opinion dated Jun. 28, 2016 for International Patent Application No. PCT/US2016/021854.

International Search Report and Wrtitten Opinion dated May 23, 2017 for International Patent Application No. PCT/US2016/068314.

International Search Report and Wrtitten Opinion dated Jan. 17, 2018 for International Patent Application PCT/US2017/52258.

USPS (Barcode, Package, Intelligent Mail Specification), Dec. 29, 2011, Rev E (Year: 2011).

* cited by examiner

METHODS AND SYSTEMS FOR DATA AUTHENTICATION SERVICES

CROSS REFERENCE TO RELATED APPLICATIONS

This application is a divisional application of U.S. patent application Ser. No. 15/066,945, filed Mar. 10, 2016, which claims priority to U.S. Provisional Patent Application No. 62/133,173, filed Mar. 13, 2015, and entitled "METHODS AND SYSTEMS FOR DATA AUTHENTICATION SERVICES." The contents of these prior applications are considered part of this application, and are hereby incorporated by reference in their entireties.

FIELD

This disclosure relates to electronic postmarks, and in particular, to Internet enabled services for obtaining and utilizing electronic postmarks.

BACKGROUND

Physical package delivery services are recognized as a secure and reliable means for sending and receiving packages and mail used for both personal and business transactions. Packages and mail sent via a package delivery service may be physically time-stamped with an official postmark, which provides the recipient with proof of the time the item was sent. Additionally, once a package or mail item is placed with the package delivery service, the item is no longer in the sender's control, and thus cannot be recalled. Furthermore, packages and mail sent through the package delivery service may be protected from third party tampering by Federal laws.

In contrast, electronic communication services and e-commerce services currently do not provide these features. As described in U.S. patent application Ser. No. 09/675,677, filed Sep. 29, 2000, entitled "Systems and Methods for Authenticating an Electronic Message," the disclosure of which is expressly incorporated herein by reference, an "electronic postmark," or EPM, provides content and temporal integrity and identification authenticity for data that is transferred over a network.

The electronic postmark provides these features by using a trusted time stamp, a hash function, and a digital signature to prove the message's origin and integrity by detecting change in the digital message. The electronic postmark also provides for non-repudiation services, as the digital signature proves who sent a message, while the timestamp proves when the message was postmarked. This can be used to resolve legal disputes and to ensure compliance with a variety of rules, regulations, and laws. The electronic postmark also enables consumers and businesses to take advantage of online contracts and commerce by offering a service for digital transactions.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features being described provide advantages that include data authentication services.

One aspect disclosed is a method of providing an electronic identification. The method includes electronically weighing a package using an electronic scale, receiving the weight of the package from the electronic scale from a network interface, transmitting by a requestor, via a first device, a request for a barcode identification over an electronic network, the request including the weight, receiving, via a second device, the request for the barcode identification from the requestor over the electronic network, decoding the request to determine an identifier of the requestor, an identifier of a user of the requested barcode, and one or more parameters associated with a mail piece, the one or more parameters including the weight. The method also includes generating the requested barcode, associating the barcode with the requestor, the user, and the one or more parameters associated with the mail piece in a data store, generating a response message comprising the requested barcode; and transmitting, via the second device, the response message to the requestor over the electronic network, and printing the requested barcode in response to receiving the response message using a barcode printer.

Another aspect disclosed is an apparatus for providing a barcode. The apparatus includes an electronic scale, an electronic barcode printer, a service providing computer, comprising an electronic hardware processor, and an electronic hardware memory, operably connected to the electronic hardware processor, a client computer, configured to receive a weight from the electronic scale over a computer interface, and generate, on behalf of a requestor, a request for a barcode over an electronic network to the service providing computer, wherein the electronic hardware memory stores a service oriented architecture module, including instructions that configure the electronic hardware processor to: receive the request for a barcode from the requestor over the electronic network, and decode from the request to determine an identifier of the requestor, an identifier of a user of the requested barcode, and one or more parameters associated with a mail piece, a barcode module including instructions that configure the electronic hardware processor to generate the requested barcode, an association module including instructions that configure the electronic hardware processor to: associate the barcode with the requestor, the user, and the mail piece in a data store, wherein the service oriented architecture module includes further instructions that configure the electronic hardware processor to: generate a response message comprising the requested barcode, and transmit the response message to the requestor over the electronic network, wherein the client computer is further configured print the requested barcode via the barcode printer in response to receiving the response message.

BRIEF DESCRIPTION OF THE DRAWINGS

These drawings and the associated description herein are provided to illustrate specific embodiments of the invention and are not intended to be limiting.

DETAILED DESCRIPTION

As described above, the electronic postmark provides many benefits. Some electronic postmarks as previously introduced also have some shortcomings. For example, given the maturity of digital signatures in the electronic document market, the known electronic postmark offers limited value over and above these existing capabilities. Additionally, while the electronic postmark offers time stamping of electronic documents, many alternative time stamping solutions are also available. Furthermore, existing electronic postmarking solutions do not provide encryption, and may provide limited assurance and trust of sender identities.

While existing electronic postmark solutions can determine whether an electronic document has changed since the postmark was created, they are unable to identify the portion of the document that has changed. No do they generally provide audit trails of changes to the document that have occurred since the electronic postmark was created.

There is also a lack of available workflow tools in the marketplace to facilitate use of the electronic postmark. Few enterprise solutions presently include or use the current electronic postmark. Therefore, application of an EPM to an electronic document is performed as an external and additional process to existing document workflow models. This results in a generally unfriendly user experience, reducing adoption of the electronic postmark.

To address the issues identified above, methods and systems are disclosed that implement a new technical framework for deploying solutions that take advantage of electronic postmarking capabilities. This framework addresses core challenges experienced by senders and recipients when communicating securely. The disclosed EPM standards framework addresses:

Who did the message come from?
Who signed the message?
When was the message sent?
Who received the message?
Has the content of the message been altered?
Is my personal information protected?
Is my personal information only shared when truly needed and with my permission?
When was the message received?
Can anyone other than the intended recipient read the message?
Can I trust the digital identity credential?
Can I prove the digital signature/will it hold up in court?

Figure 1A:
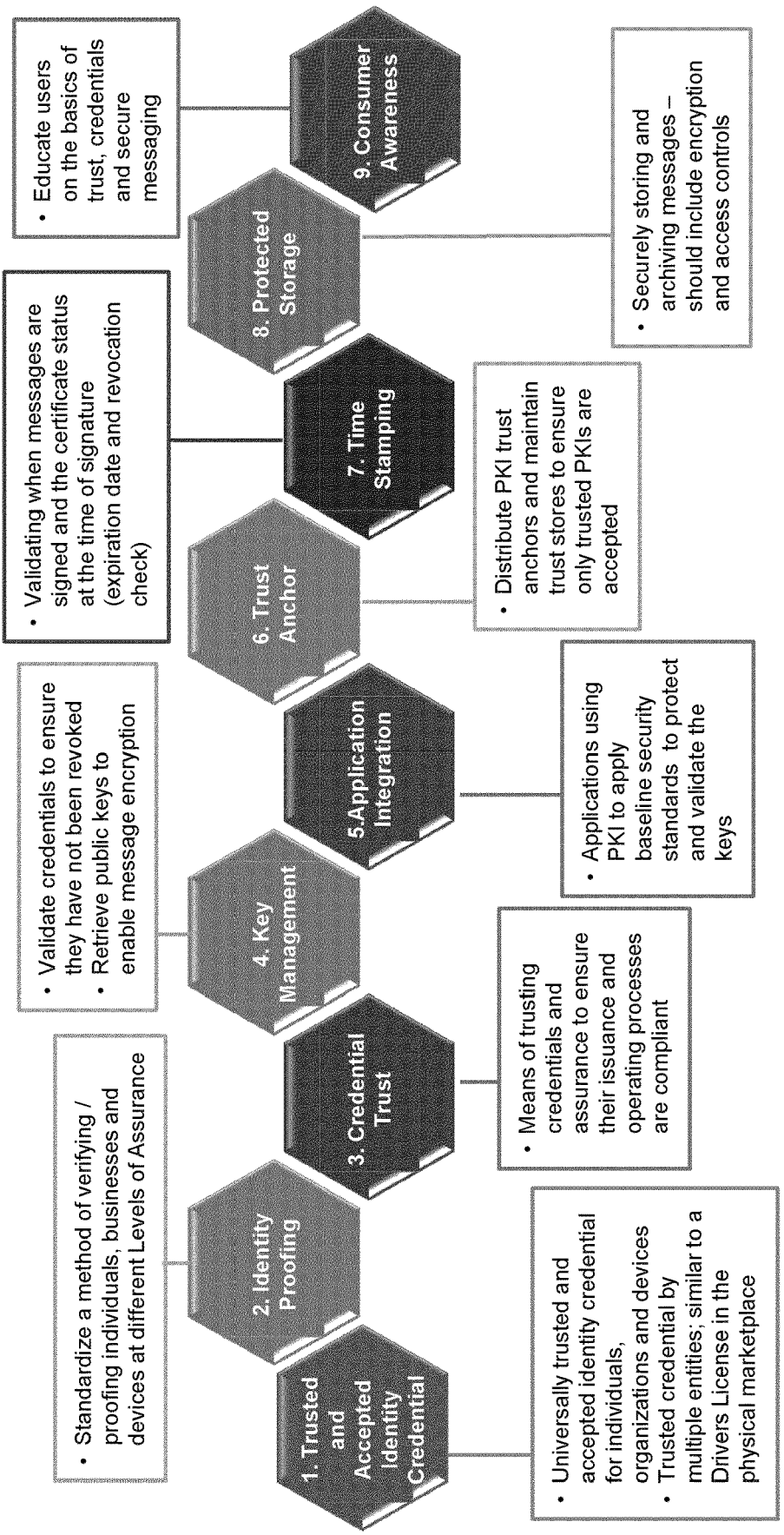
FIG. 1A is a diagram of a proposed EPM standards framework.

FIG. 1A shows an EPM standards framework. The disclosed framework includes at least nine components as shown below:

1. Trusted and Accepted Identity Credential
   a. Universally trusted and accepted identity credential for individuals, organizations and devices
   b. Trusted credential by multiple entities; similar to a Driver's License in the physical marketplace.
2. Identity Proofing
   a. Standardizes a method of verifying/proofing individuals, businesses, and devices at different level so assurance.
3. Credential Trust
   a. Ensures credentialed organizations are in compliance with the framework's standards.
4. Key Management
   a. Validates credentials
   b. Retrieves public keys for use in message encryption
5. Application Integration
   a. Applications using PKI to apply baseline security standards to protect and validate keys.
6. Trust Anchor
   a. Distribute PKI trust anchors and maintain trust stores to ensure only trusted PKIs are accepted
7. Time Stamping
   a. Validates when messages are signed and a certificate status at the time of signature (expiration date and revocation check)
8. Protected Storage
   a. Securely stores and archives messages, including encryption and access controls
9. Consumer Awareness
   a. Educates users on the basics of trust, credentials, and secure messaging.

Figure 1B:
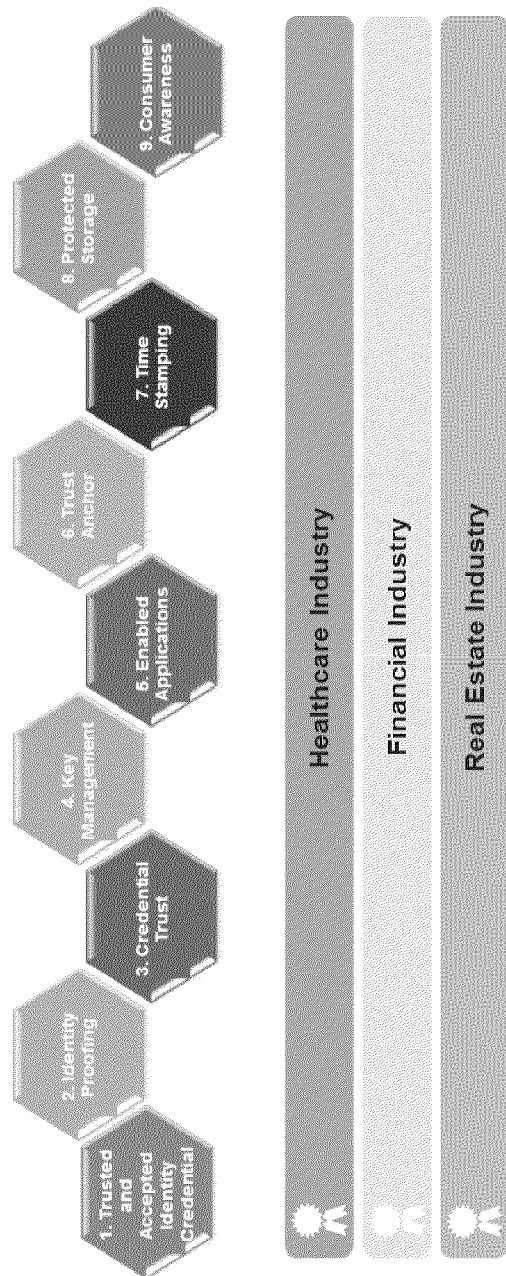
FIG. 1B is a diagram showing that the nine components of the electronic postmark framework may be leveraged across multiple industry segments, including healthcare, financial, and real estate.

FIG. 1B shows that the nine components of the electronic postmark frame may be leveraged across multiple industry segments, including healthcare, financial, and real estate.

Figure 2:
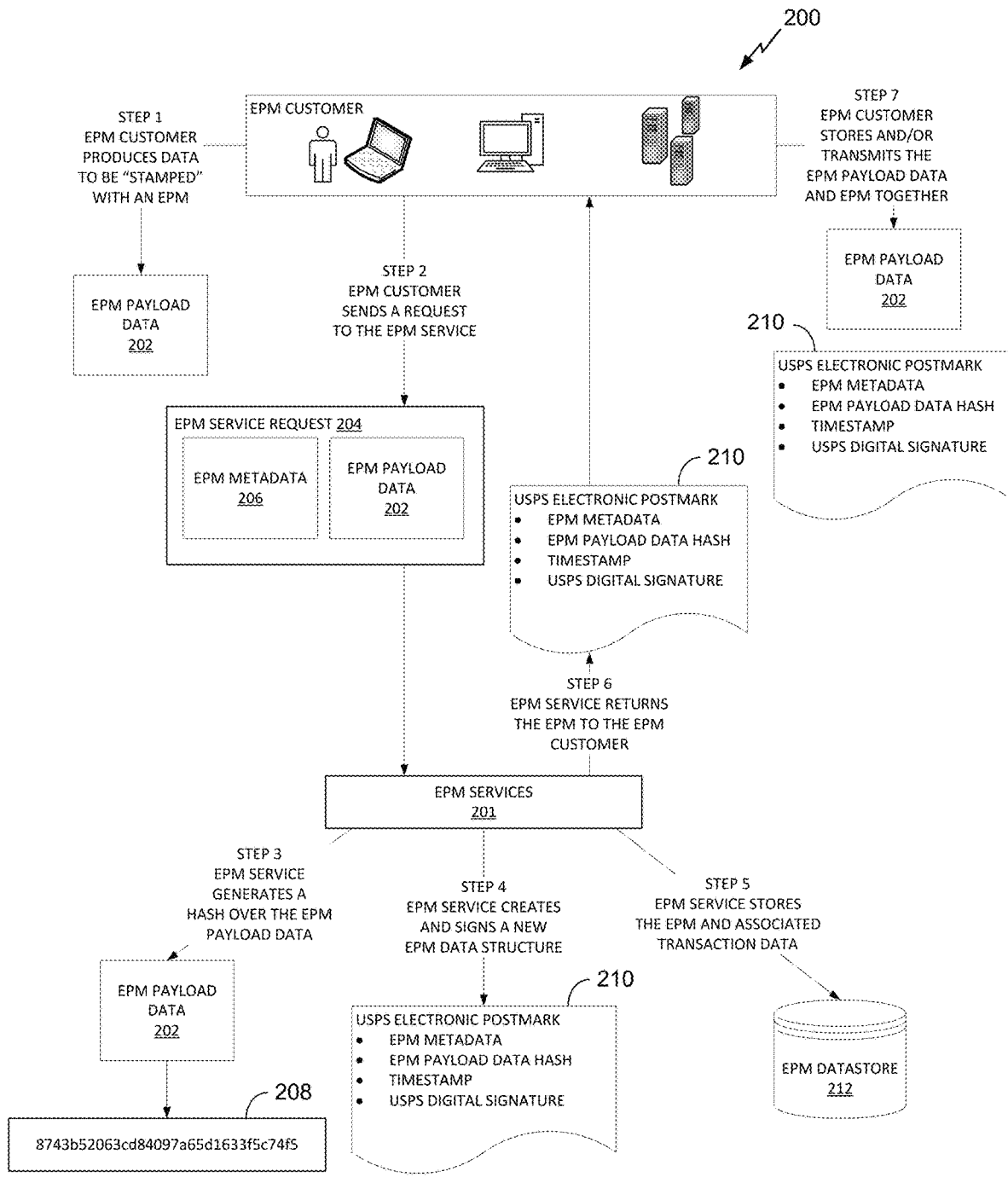
FIG. 2 is a flow chart of a method for an EPM customer to obtain electronic postmark services from an electronic postmark services component.

FIG. 2 is a process flow diagram showing one example of an EPM customer obtaining electronic postmark services from an electronic postmark services component 201. Throughout this disclosure, an electronic postmark may be generated to guarantee non-repudiation and authenticity of a set of data, referred to herein as payload data. The payload may represent any block of electronic data that can be expressed as a finite-size array of bytes. Payload data may exist in any electronic form, including structured text, documents, images, binary executables, and compressed archive files, to name a few non-limiting examples.

An electronic postmark may, in some aspects, be structured using an XML data format. In some aspects, the electronic postmark is defined in the USPS EPM XML Schema. In some aspects, data defining an electronic postmark may include attributes of the electronic postmark, system audit information, and payload metadata. Data defining an electronic postmark may not include payload data. Instead, a user of an electronic postmark may store and utilize the electronic postmark and payload data validated by the electronic postmark as a pair.

Disclosed is an electronic system that exposes electronic postmark specific operations through a web service. The web service may utilize standard SOAP protocols to identify which operations are to be performed and to facilitate the exchange of data between a requester and a service provider. A service contract between the requester and service provider may be defined by a standard web service definition language (WSDL) document, which identifies a web service, operation, and parameter names and locations. A standard extensible markup language (XML) schema may also be utilized in some embodiments, which defines electronic postmark data structures used by the various disclosed services.

In some aspects, a requester of an electronic postmark service may utilize a registered X.509 certificate to digitally sign the service request. In some aspects, a service request may be timestamped. In some aspects, a request may be encrypted at least such that application specific data is not in clear text. In some aspects, requests include a token indicating a username and password. In some aspects, the disclosed responses may be digitally signed by the service providing system. In some aspects, the disclosed responses may be encrypted. For example, in some aspects, response data may be encrypted.

The electronic postmark services component provides a network communication interface that allows network clients to obtain electronic postmarks for a variety of types of electronic data. In fact, almost any type of electronic data may be protected using an electronic postmark using the electronic postmark services component.

To utilize the disclosed methods and systems, a user may need to complete a registration process. During the registration process, a billing account may be created in an accounting database, such as the accounting database 535 discussed below with respect to FIG. 5. As part of the registration process, the customer may be provided with a unique identifier for use in billing and making requests to the web services described below. This unique identifier may be referred to throughout this disclosure as either a requester account id and/or a billing account identifier. The registration process may include establishing a billing account and obtaining electronic postmark credentials (user name and password) for access to the web services disclosed below. Creating or obtaining a valid X.509 certificate and associated private key and providing the certificate to the DES system discussed below. Obtaining an X.509 certificate of the DES system itself.

In step 1, the EPM customer produces data 202 to be "stamped" with an electronic postmark. The payload data 202 may be any electronic data. In step 2, the EPM customer initiates a request to an electronic postmark service 201. The request may include an EPM service request 204. The EPM service request 204 may include both EPM metadata 206 and the EPM payload data 202.

Upon receiving the EPM service request 204, the EPM services component 201 generates a hash 208 for the EPM payload data 202 in step 3. The EPM service component 201 also creates and digitally signs a new electronic postmark structure 210 in step 4. The electronic postmark structure includes EPM metadata 206, the EPM payload data hash 208, a timestamp, and the digital signature. The EPM Services component 201 then stores the EPM structure 210 in an EPM Data store 212 in step 5. In some aspects, the EPM data store 212 may be the same data store as the EPM database 530 discussed below with respect to FIG. 5. In step 6, the EPM services 201 returns the electronic postmark 210 to the customer. In step 7 the customer may store and/or transmit the EPM payload data 202 and EPM 210 together as a single set of bits.

Figure 3:
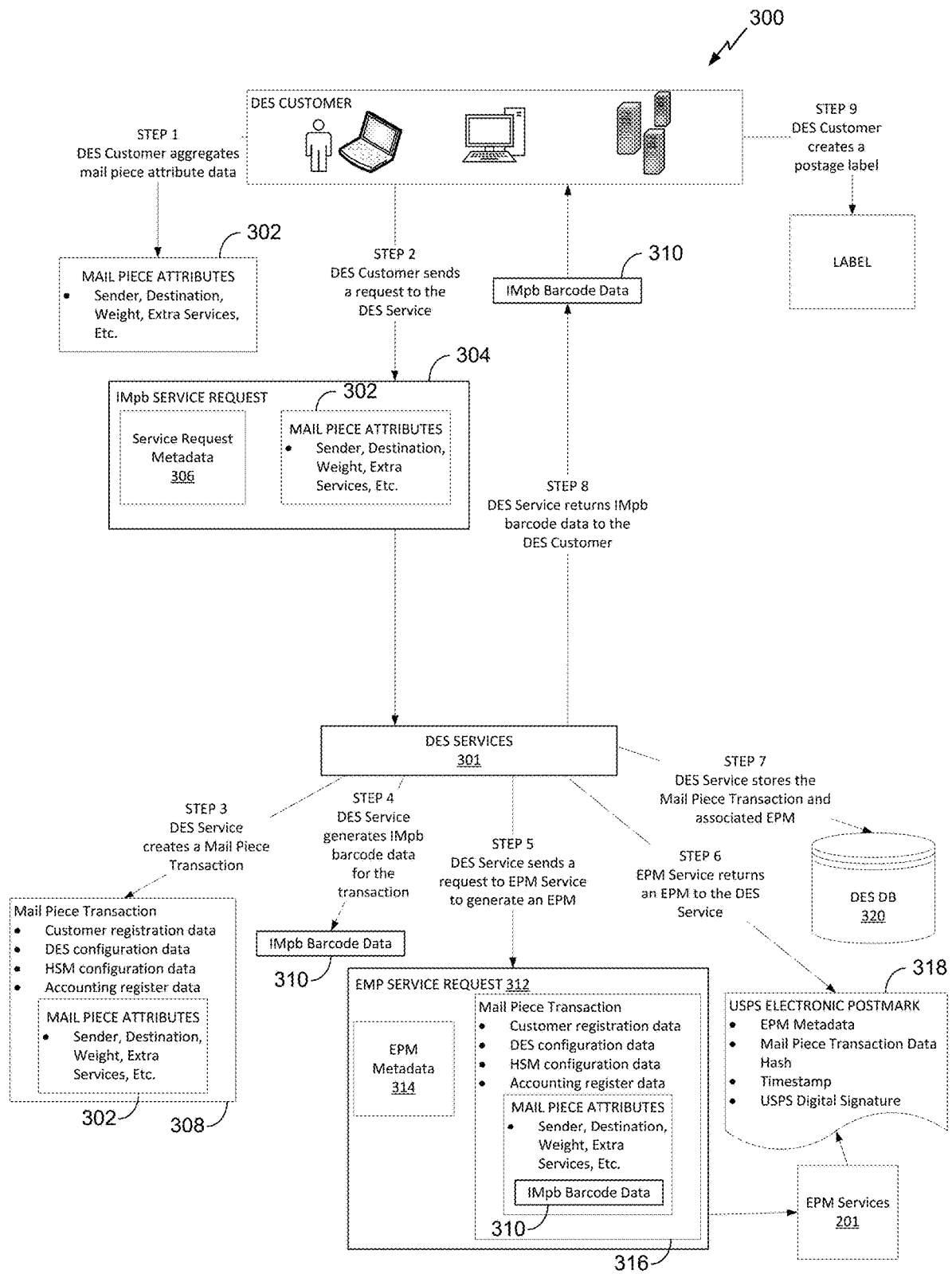
FIG. 3 is a flow chart for a method of managing information relating to a mail piece via a digital evidencing system services component.

FIG. 3 shows a process flow for a method of managing information relating to item via a digital evidencing system services component 301. In some aspects, the item may be a mail piece. In other aspects, an item may be any physical good. The digital evidencing system services component provides a network communication based interface for obtaining an Intelligent Mail Package Barcode (IMpb) over the communications network. In combination with the electronic postmarking service described above, DES and EPM may allow for manifesting and blockchain/chain of custody for the purposes of compliance checks, fraud detection, and payment and reconciliation. In some aspects, this may be accomplished by externalizing the "manifest" allowing a sender/receiver to add additional context or details to the "manifest." This would allow for the shared validation via EPM validation services (discussed below with respect to FIGS. 10-14 and the accompanying description).

In step 1, a mail customer aggregates attributes 302 of an item, such as a mail piece (as illustrated). Attributes may include information relating to a sender of the item, destination of the item, the weight of the item, additional services requested for the item, etc. In step 2, a customer initiates a service request 304 to the digital evidencing service component 301. The service request 304 may contain service request metadata 306 and the attributes 302.

Upon receiving the service request 304 as part of step 2, the digital evidencing services component 301 may create a transaction record 308 in step 3. The transaction record may include one or more of customer registration data, digital evidencing system (DES) configuration data, health system model (HSM) configuration data, and accounting register data. The attribute information 302 may also be included in the transaction record 308.

The DES services component 301 may then create intelligent mail package barcode (IMpb) data 310 for the transaction in step 4. The DES services component 301 may then generate an electronic postmark in step 5. In some aspects, the DES services component 301 may generate an EPM service request 312 and transmit the service request 312 to an EPM services component, such as the EPM services component 201 described above with respect to FIG. 2.

The EPM service request 312 may include EPM metadata 314 and EPM payload data 316. In some aspects, the EPM metadata 314 may include EPM payload metadata. This metadata may specify, for example, information about the origin of the item, information about the recipient of the item, an identifier of the mailer of the item, and an identifier of the provider of the item.

In some aspects, the EPM payload data 316 may include the item transaction record 308. The EPM payload data 316 may also include the intelligent mail package barcode (IMpb) barcode data 310, for example, as part of the item attribute data 316. After processing the EPM services request 312, in some aspects, as described above with respect to process flow 200 of FIG. 2, the EPM services component 201 generates an electronic postmark 318. As discussed above, in some aspects, the electronic postmark 318 includes one or more of EPM metadata, transaction data hash, a timestamp, and a digital signature. The generated electronic postmark is then transmitted to the DES services component 301 in step 6.

The DES services component 301 may then store the transaction and associated EPM information in a DES data store 320 in step 7. The DES data store 320 described with respect to FIG. 3 may be equivalent to one or more of the EPM database 530 of FIG. 5 or the EPM database 730 of FIG. 7. The DES services component 301 then returns the barcode data 310 to the DES customer in step 8. The customer may then affix the barcode to a package that is processed by a shipment processing system in step 9.

By storing the item transaction and associated EPM information in a DES data store, the DES system 300 may enable reporting capabilities not available with current systems. For example, reports may be provided that show item volumes associated with one or more parameters in the item transaction record 308. Additionally, specialized reports may also be provided regarding parameter EPM metadata, and how particular EPM metadata relates to item types, volumes, and the like.

Figure 4:
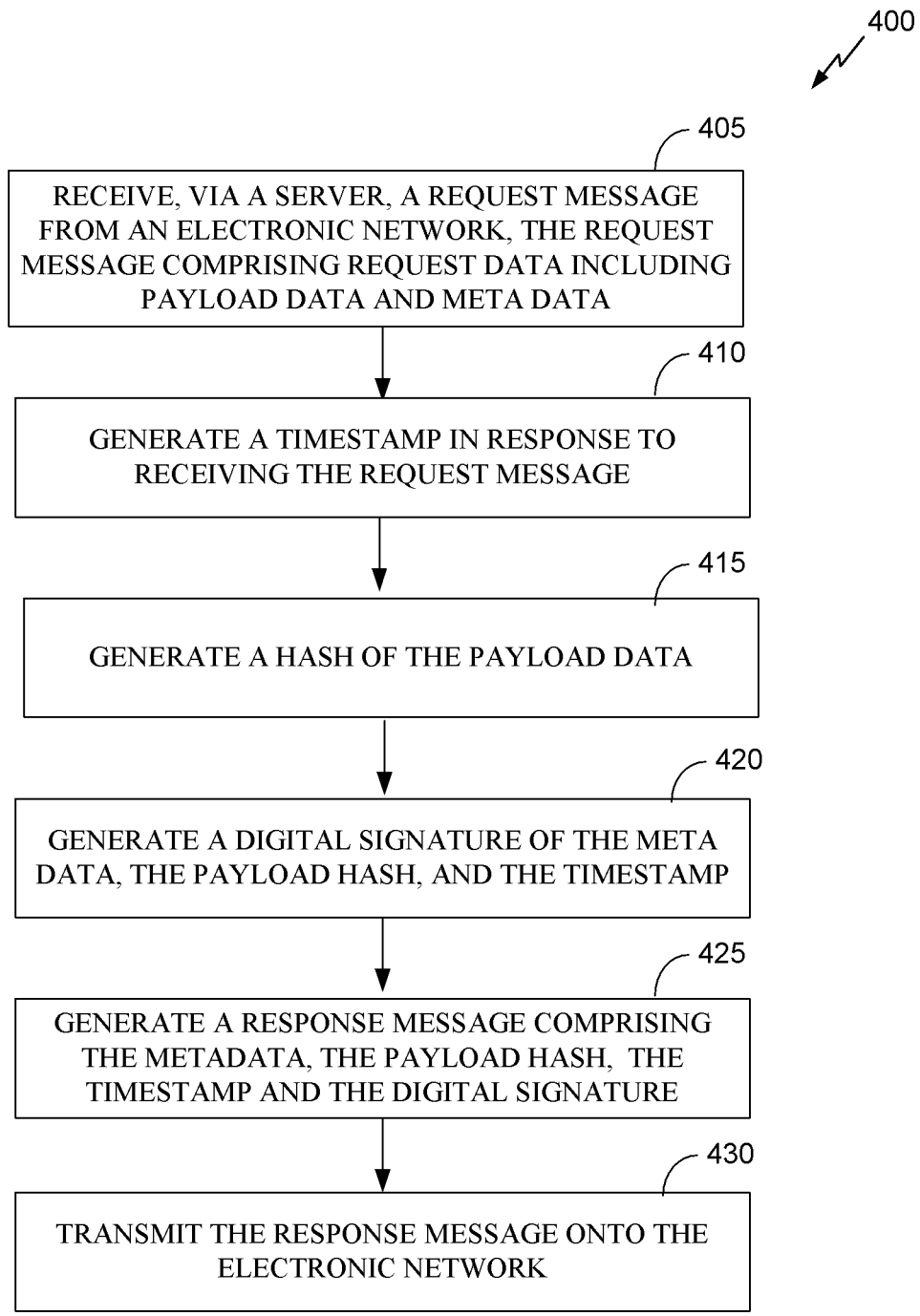
FIG. 4 is a flowchart of a method of generating an electronic postmark.

FIG. 4 is a flowchart of a method of generating an electronic postmark. In some aspects, the method 400 disclosed with respect to FIG. 4 may correspond to the process described with respect to FIG. 2. In some aspects, the method 400 may be performed by the apparatus 500 of FIG. 5.

An entity, such as a package shipping company, may provide customers with ability to store and/or transmit electronic documents and other forms of electronic data. The electronic data may be sensitive and/or valuable to the end users, such that the customer needs to be able to ensure non-repudiation and authenticity as part of its storage and transmission functionality. In order to ensure non-repudiation and authenticity, an electronic postmark (EPM) may be generated for the electronic data through an approved digital evidencing system (DES). Specific pieces of metadata related to the end user and to the electronic data, as well as a payload of the actual data itself, may be used to generate the electronic post mark. The customer may utilize a service application programing interface (API) that accepts the metadata and electronic payload as inputs in order to generate the electronic postmark. Once inputs are received, the digital evidencing system (DES) may generate a digital hash over the payload data, combine the hash, metadata, and timestamp into an EPM data structure, and then may digitally sign the EPM data structure and store it for audit purposes. The EPM data structure may then be returned to the customer so that the customer can save the EPM to a local file or data store along with the original data and/or transmit both to a 3rd party. If the customer submits invalid or insufficient data, the EPM may not be generated and the DES may return an error to the customer.

An electronic postmark is generated to guarantee non-repudiation and authenticity of a set of data. That set of data may be referred to as an electronic postmark payload. The EPM payload may represent almost any block of electronic data that can be expressed as a finite-size array of bytes. EPM payload data may exist in almost any electronic form, including structured text, documents, images, binary executables, and compressed archive files. In some aspects, an electronic postmark (EPM) may be a set of XML structured/formatted data defined in a DES XML schema. The EPM data structure may consist of one or more of the following components: EPM attributes, system audit information, and/or EPM payload metadata.

An electronic postmark may not contain actual EPM payload data, nor does it necessarily provide confidentiality by encrypting EPM payload data. Instead, an EPM exists external to the EPM payload for which it was generated. In order to ensure that an EPM is associated to a correct EPM payload, an EPM customer may store and/or transmit the EPM payload data and EPM in such a way that the relationship between the two is maintained.

In some aspects, a requester operating a client computer (such as client computer 550 of FIG. 5 below) may weigh a mail item via an electronic scale, such as electronic scale 555 shown below in FIG. 5. The client computer may be configured to generate a request for an electronic postmark for the mail item. In some aspects, the weight of the mail item may be included as metadata in the request. The request may be transmitted over an electronic network to a web service.

In block 405, the request message is received by a server. In some aspects, the request message is in the form of a simple object and access protocol (SOAP) message. In some aspects, the message is a "restful" message, such as an HTTP request message. In some aspects, the reception of the request message is preceded by the opening of a secure session with a device transmitting the request message. The request message is then received over the secure connection.

In some aspects, before processing the message, block 405 determines whether the request message includes a digital signature of the request message. In some cases, the digital signature may be based on a X.509 digital certificate. In some aspects, block 405 verifies whether the message includes a timestamp and/or a security token including a predetermined identifier. In some aspects, block 405 determines whether the request message is encrypted. Various aspects of the method may reject the request message if one or more of these conditions are not satisfied.

In some aspects, block 405 may also extract customer account information from the request. For example, in some aspects, the request may include one or more of a requester account identifier and a billing account identifier. In some aspects, the requester account identifier is the customer account identifier of a party initiating the request received in block 405. In some aspects, the billing account identifier may be an account identifier of a party that is financially responsible for generation of the electronic postmark requested in block 405. In some aspects, block 405 includes querying an accounting database to verify the account identifiers included or otherwise indicated in the request are in good standing. For example, in some aspects, block 405 may query the accounting database 535, discussed below with respect to FIG. 5, to verify the billing account identifier is in good standing before continuing to process the request.

In some aspects, the request message includes request data, which includes payload data and metadata. In some aspects, the metadata may be data pertaining to a mail piece. For example, the metadata may define one or more of information relating to an origin of a mail piece, information relating to a recipient of a mail piece, an identifier of a mailer of a mail piece, and an identifier of a provider of the mail piece.

In some other aspects, the metadata may be data pertaining to healthcare information. For example, in these aspects, the metadata may define one or more healthcare attributes as defined in an HL7 message header. For example, the metadata may define one or more of a sending application, sending facility, sending responsible organization, sending network address, receiving application, receiving facility, receiving responsible organization, receiving network address, security information, message type information, message control identification information, a processing identifier, a version identifier, sequence number information, an indication of an acknowledgment type, a country code, an identifier of the language of the message, and a provider identifier.

In some aspects, the payload data may include an email message, healthcare information, or a direct protocol message.

In some aspects, the request message may also include a requestor account identifier or a billing account identifier. These values may be decoded from the request message.

In block 410, a timestamp is generated in response to receiving the request message. In block 415, a hash of the payload data is generated.

In block 420, a digital signature of the metadata, the payload hash, and the timestamp is generated. Some aspects of block 420 may store an association of the metadata, the payload hash, the timestamp, and the digital signature in a data store, such as, for example, in a database that is accessible to one or more reporting engines. For example, in some aspects, block 420 may store the association in the EPM database 530, discussed below with respect to FIG. 5. The database may be used to generate reports relating to how electronic postmarks are utilized. For example, by using this database, the number of electronic postmarks created by particular customers may be determined. For example, the database may be queried to return records with metadata provider/user identifiers equivalent to a particular value. In addition, the types of data being postmarked may also be characterized in some aspects.

In block 425, a response message is generated that includes the metadata, the payload hash, the timestamp, and the digital signature. For example, in some aspects, the response message is generated to comprise an electronic postmark that is based on the metadata and payload data provided in the request message. In some aspects, the response message is also digitally signed. In some aspects, the response message may also include a Trustmark. The Trustmark may be image data forming an image than encodes one or more of the metadata, payload hash, timestamp, and digital signature.

In block 430, the response message is transmitted onto the electronic network. In aspects that digitally sign the response message, the digital signature of the response message is included in the transmission of the response message.

In some aspects, the response message is transmitted to a device that transmitted the request message. In some aspects, the request message of block 430 and the response message of block 430 may comprise a "restful" (such as provided by the hyper-text transfer protocol (HTTP) protocol) or a SOAP protocol exchange.

Figure 5:
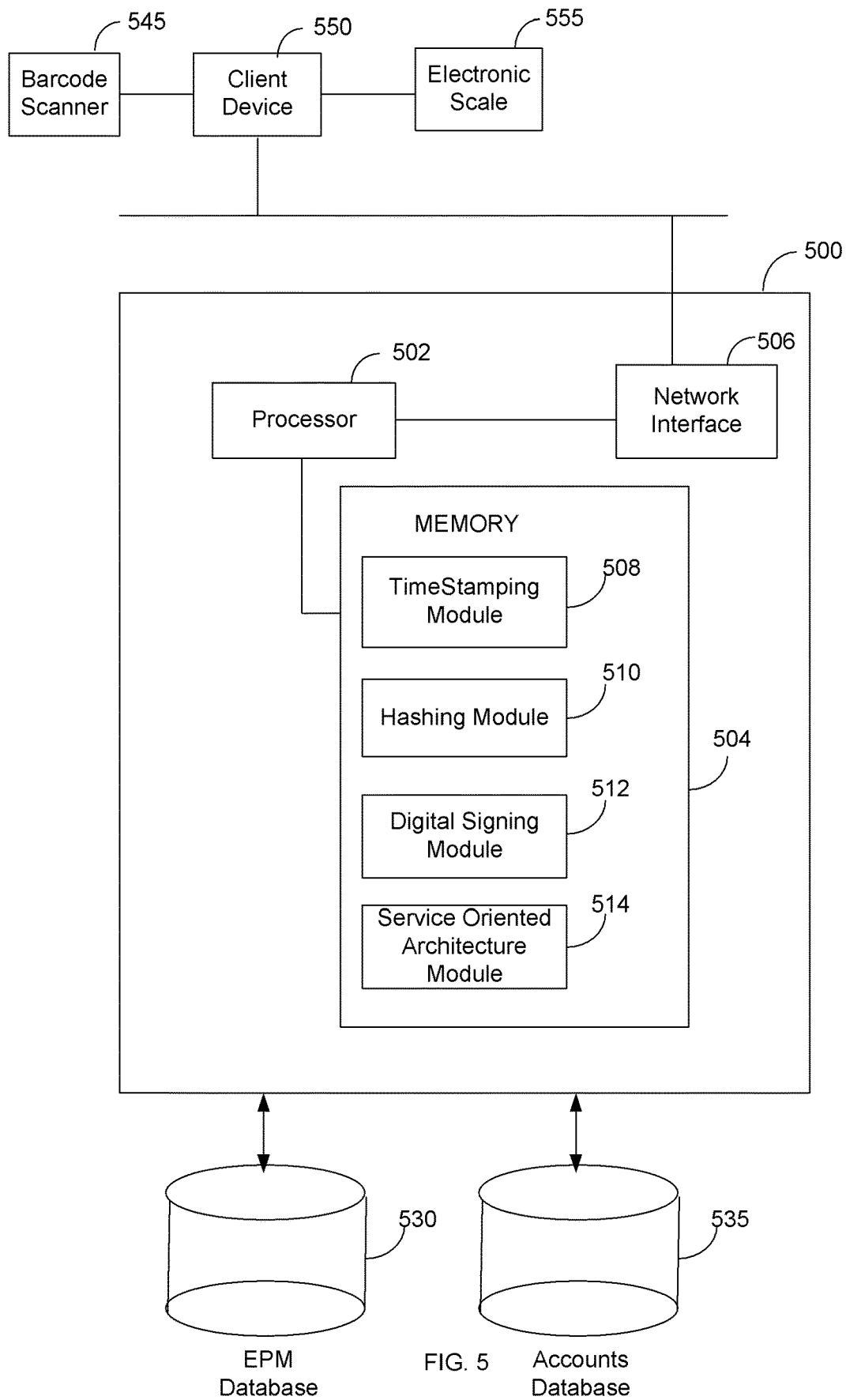
FIG. 5 is a functional block diagram of an apparatus that may be configured to perform one or more of the disclosed embodiments.

FIG. 5 is a functional block diagram of an apparatus that may be configured to perform one or more of the disclosed embodiments. The apparatus 500 includes a processor 502, memory 504 operably connected to the processor, and a network interface 506 that is also operably connected to the processor. The apparatus 500 may be configured to read and write data to one or more databases. For example, as shown, the apparatus 500 may be configured to store and retrieve electronic postmark related information from an EPM database 530. The apparatus 500 may be configured to read/write accounting information from an accounts database 535.

The memory 504 stores instructions that configure the processor 502 to perform operations. The instructions stored in the memory 504 are organized into modules. Instructions in the time stamping module 508 may configure the processor 502 to perform one or more of the functions discussed above with respect to block 410 of FIG. 4. A hashing module 510 includes instructions that configure the processor 502 to perform one or more of the functions discussed with respect to block 415 of FIG. 4. A digital signing module 512 includes instructions that configure the processor 502 to perform one or more of the functions discussed above with respect to block 420. A service oriented architecture module 514 includes instructions that configure the processor 502 to perform one or more of the functions discussed above with respect to block 405 and/or 425 and/or 430.

FIG. 5 also illustrates a client device 550, a barcode scanner 545, and an electronic scale 555. The client device 550 may be in communication with the apparatus 500 via an electronic network and the network interface 506.

Figure 6:
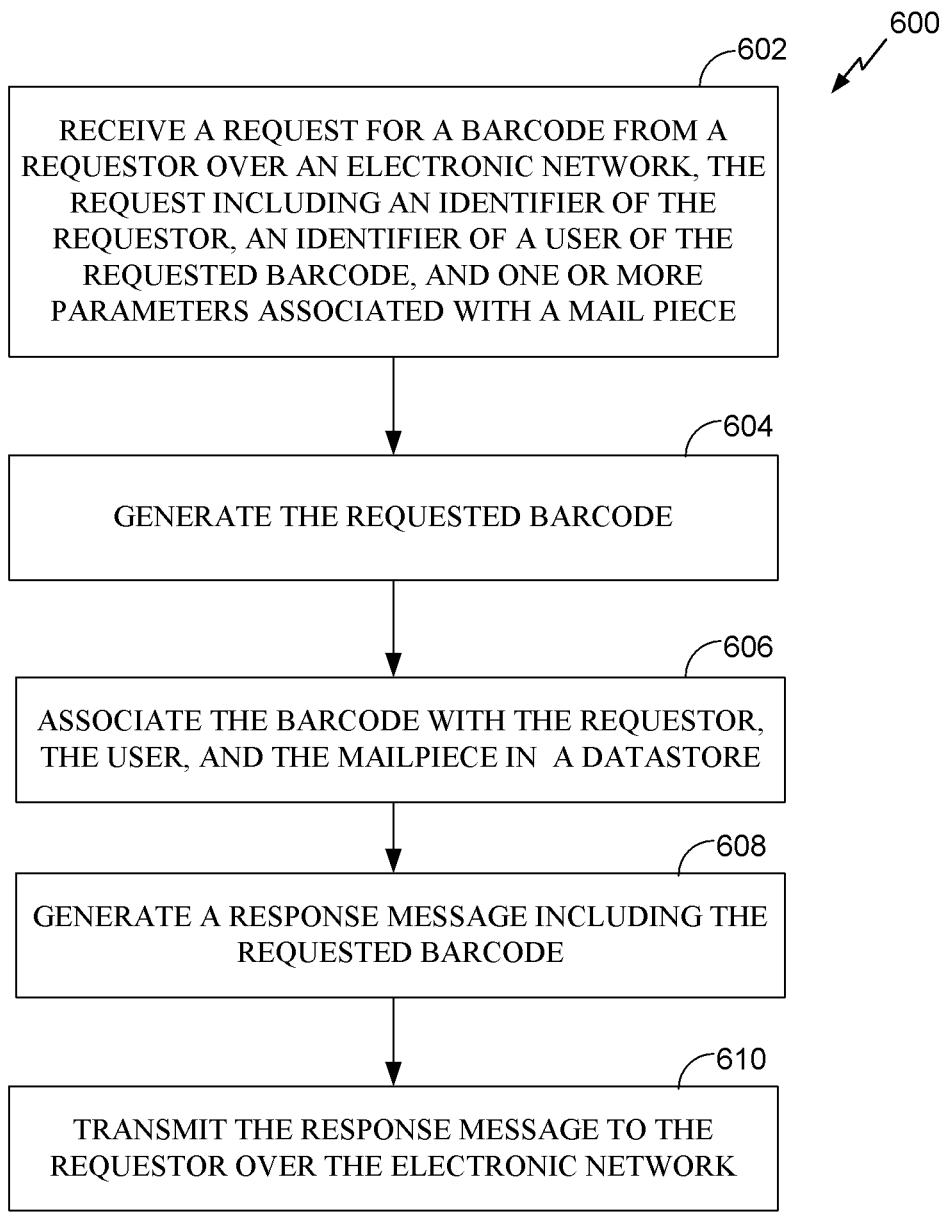
FIG. 6 is a flowchart of a method of providing a barcode for a mail piece.

FIG. 6 is a flowchart of the method of providing a barcode for a mail piece. In some aspects, the method 600 described with respect to FIG. 6 may correspond to the process discussed above with respect to FIG. 3. In some aspects, the method 600 may be performed by the apparatus 700 disclosed below with respect to FIG. 7. A digital evidencing system (DES) may provide means to digitally sign and timestamp various types of electronic data. In some cases, an implementer of a DES may be trusted within the community in which it operates, thus instilling a level of confidence in the protection provided. The process of digitally signing and time stamping electronic data through a DES results in the creation of an Electronic Postmark (EPM). While many forms of secure communication provide security for electronic data in transit, the EPM provides authenticity, data integrity, and non-repudiation for electronic data in transit and at rest. This allows the data to be stored and/or transmitted with an assurance of integrity and with a verifiable audit trail.

An EPM can generally be applied to most forms of electronic data. However, in addition to an EPM, a digital evidencing system may also provide specialized mail piece services to generate Intelligent Mail Package Barcode (IMpb) data for use in the creation of postage labels. Each IMpb transaction includes the generation of IMpb data as well as an associated EPM, which can be used to verify the integrity and authenticity of mail pieces throughout the delivery process. IMpb data is returned to the mail piece service client.

In some cases, a customer may provide an end user with an ability to create and print postage labels online. The customer may need to generate an intelligent mail package barcode (IMpb) as part of the process for creating a postage label. The IMpb may be generated through an approved DES to ensure uniqueness of the barcode value and also to create an associated EPM. Specific pieces of data related to the mail piece, or mail piece attributes, may be needed to generate the IMpb and EPM. The customer can utilize a DES service API that accepts these mail piece attributes as inputs to generate the IMpb. Once inputs are received, the DES digitally signs the data and generates an associated EPM, which is then stored in the DES database for internal use. The DES then returns a valid IMpb to the customer. If the customer submits invalid or insufficient data, neither the IMpb nor the EPM are generated and the DES returns an error to the customer.

In some aspects, a customer may obtain data regarding a mail piece. For example, a customer may obtain source and destination address information, dimensions of the mail piece, and a weight of the mail piece. In some aspects, the weight of the mail piece may be obtained via an electronic scale that is in electronic communication with a computer. For example, in some aspects, the electronic scale 765 discussed below with respect to FIG. 7, may be used to obtain a weight of the mail piece. The client device 750, also discussed below with respect to FIG. 7, may interface with the electronic scale.

Once the information regarding the mail piece is obtained, the client device 750 may generate a request to a web service to obtain a bar code for the mail piece. The bar code may enable to the mail piece to be shipped via a shipping service in some aspects. The request may be transmitted over an electronic network to a server providing the web service interface. The process 600 below describes how, in some aspects, a computer implementing the web server may process and respond to the received request.

In block 602, a request is received for a barcode from a requestor over an electronic network. The request may be received in various forms, including, for example, as a "restful" message such as a hypertext transfer protocol (HTTP) message or as a service oriented application protocol (SOAP) message. The requestor may be a registrant of a security account under which the request is received. For example, in some aspects, the requestor may be identified by an account identifier, which may be of record in, for example, the accounts database 535, discussed above with respect to FIG. 5.

In some aspects, the request may be received within a secure session that is initiated based on authentication credentials of a registrant. The request also includes a user/provider of the requested barcode. In some cases, the user/provider of the requested barcode is the requestor. In some other aspects, the user is distinct from the requestor. For example, in some aspects, an account registrant may be able to associate one or more users with the account. The user identified in the message may be one of the associated users.

The request also includes one or more parameters associated with a mail piece. Each of these parameters may be decoded from the request message. These parameters can include information relating to a creation date of the mail piece, mailing date of the mail piece, mail class of the mail piece, an identifier of a price table for the mail piece, a postage type ("C" or "P" for example), an identifier of a contract number for shipping services, an identifier of a product for a shipping services contract, a rate indicator (e.g. "01"), an indication of whether a signature waiver is recorded for the mail piece, an indication of a delivery option for the mail piece, information specific to the person or organization printing the postage label and sending the mail piece, a return address of the mail piece, a destination of the mail piece, a list of extra services applied to and paid for as part of the mail piece postage. In some aspects, one extra service element may be present for each extra service applied to the mail piece postage, a postage value of the mail piece, an evidence type indicator, an indication of the mail piece weight, dimension information, international shipping information. An intelligent mail package barcode specification including data structures and requirements for each of the IMpb formats was published by the United States Postal Service on Dec. 29, 2011. The specification is revision E, and carries the USPS number 2000508, and cage code 27085. This specification is hereby incorporated by reference in its entirety.

The parameters may also include sender related information, such as names, contact information, whether the sender is qualified to ship hazardous materials, return address information. The parameters may also include destination related information, such as names and contact information. The parameters may also include postage information, such as fee information, postage value information, evidence type information, weight information, dimension information, international shipping information, and intelligent mail package barcode information.

In block 604, the requested barcode is generated. In some aspects, the requested barcode is generated to contain one or more particular components. For example, in some aspects, 10 digits of the requested barcode are generated to create a ten digit intelligent mail package barcode (IMpb). In some aspects, the request barcode is generated to be twenty two digits in length, with ten of those digits formed by the IMpb. In some aspects, the IMpb may be 22 or 34 digits. In some aspects, a portion of the generated barcode may identify a computer system that is generating the barcode. For example, the generated barcode may include a server instance identifier. In some aspects, a digital evidencing system that generates barcodes may be hosted by and maintained within the United States Postal Service organization. However, even within one installation, there may be multiple server instances implementing barcode generation capabilities, or, in other words, an ability to perform method 600. Additionally, some implementations may run on servers maintained/hosted by other organization, such as partner or customer organizations. These various systems that implement process 600 may be provided with unique identifiers. These unique identifiers or server instance identifiers may be indicated in the barcodes generated by those respective systems. Such a design may provide forensics capabilities after the barcode is generated. For example, with this design, it may be possible to derive which server or digital evidencing system installation generated a particular barcode, by examining the barcode and decoding the server instance identifier.

In some aspects, the barcode may be generated to include a serial number. For example, when a system implementing process 600 is first installed or otherwise initialized, a serial number may be set to an initial value, such as zero (0). Each time a barcode is generated by the system running process 600, the serial number may be incremented. This serial number may then be indicated in the generated barcode. In some aspects, the barcode may also indicate a provider and/or user identifier.

In some aspects, block 604 may also include generating an electronic postmark based on the request message. The electronic postmark may be further based on the generated barcode in some aspects. For example, the generated barcode may be at least part of the data for which the EPM is generated. In some aspects, the method 400 may be used to generate the electronic postmark. In some aspects, the functions discussed above with respect to block 604 may be performed by instructions included in the In block 606, the generated barcode is associated with the requestor, the user and the mail piece parameters in a data store. In aspects that generate an electronic postmark as described above, the electronic postmark may also be associated with the barcode and the requestor, user, and mail piece parameters in the data store. By associating the barcode with the mail piece parameters, requestor, and user in a data store, the disclosed methods and systems enables powerful reporting capabilities relating to barcodes and mail pieces. For example, with this data store, reports identifying the types of mail pieces processed by particular users and/or requestors can be generated. In some aspects, the data store referenced with regard to block 606 may be one or more of the EPM database 730, EPM database 530.

In block 608, a response message is generated that includes the requested barcode. In some aspects, the response message may include an electronic postmark generated (optionally) in block 606.

In block 610, the response is transmitted to the requestor over the electronic network. When the requestor receives the response, they may print the generated barcode using a barcode printer, such as barcode printer 755 discussed below with respect to FIG. 7. After the barcode is printed, it may be attached to the mail piece to facilitate shipping.

Figure 7:
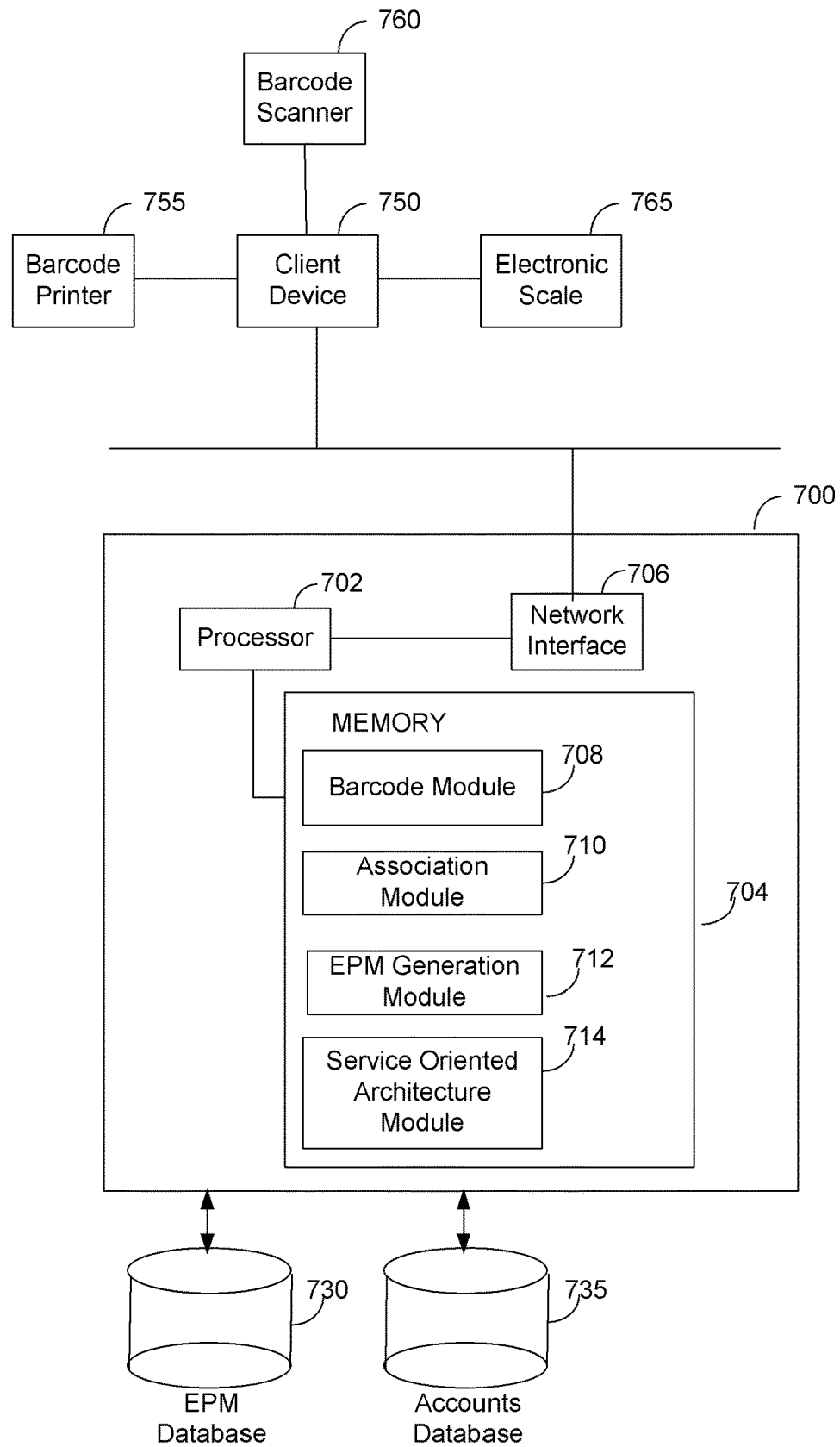
FIG. 7 is a functional block diagram of an apparatus that may be configured to perform one or more of the disclosed embodiments.

FIG. 7 is a functional block diagram of an apparatus that may be configured to perform one or more of the disclosed embodiments. In some aspects, the apparatus 700 may be integrated with the apparatus 500 disclosed with respect to FIG. 5. The apparatus 700 includes a processor 702, memory 704 operably connected to the processor, and a network interface 706 that is also operably connected to the processor. The apparatus may be configured to read and/or write data to the EPM database 730 and/or the accounts database 735. The memory 704 stores instructions that configure the processor 702 to perform operations. The instructions stored in the memory 704 are organized into modules. Instructions in the barcode module 708 may configure the processor 702 to perform one or more of the functions discussed above with respect to block 604 of FIG. 6. An association module 710 includes instructions that configure the processor 702 to perform one or more of the functions discussed with respect to block 606 of FIG. 6. An EPM generation module 712 includes instructions that configure the processor 702 to perform one or more of the EPM generation functions discussed above with respect to block 606 of FIG. 6. In some aspects, the EPM generation module 712 may include instructions that implement one or more of the functions discussed above with respect to FIG. 4. For example, in some aspects, the EPM generation module 712 may implement functions described with respect to at least blocks 410, 415, and 420. A service oriented architecture module 714 includes instructions that configure the processor 702 to perform one or more of the functions discussed above with respect to block 602 and/or 608 and/or 610.

In some aspects, the apparatus 500 may be integrated with the apparatus 700. For example, in some aspects, the processor 702 may be the same processor as processor 502. The memory 704 may be the same memory as memory 504 in some aspects. The interface 706 may be the same interface as interface 506 in some aspects. The memory 504 may store one or more of the modules 708, 710, 712, and 714 in some aspects. In some aspects, the EPM database 730 may be the same database as the EPM database 530. In some aspects, the accounts database 735 may be the same database as the accounts database 535.

FIG. 7 also illustrates a client device 750, barcode printer 755, barcode scanner 760, and electronic scale 765. In some aspects, the client device 750 may be the same client device as client device 550, discussed above with respect to FIG. 5. In some aspects, the barcode scanner 760 may be the same barcode scanner as barcode scanner 545. In some aspects, the electronic scale 765 may be the same electronic scale as electronic scale 555. The client device 750 may be in communication with the apparatus 700 via an electronic network and the network interface 706.

Figure 8:
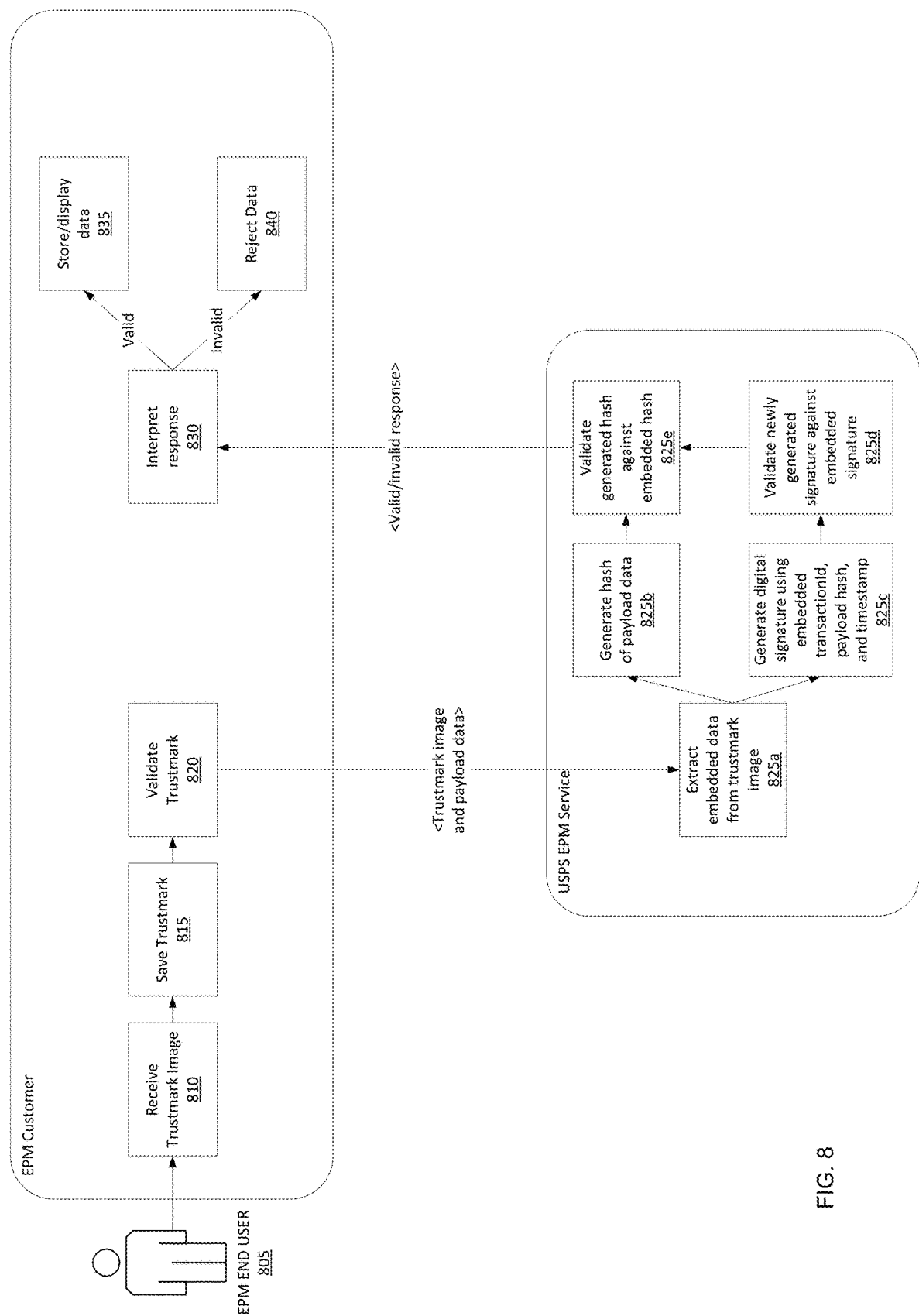
FIG. 8 is a flow chart of a method for validating a Trustmark image for an electronic postmark.

FIG. 8 is a flowchart of a method for validating an electronic Trustmark. An electronic postmark may include two forms of data in some aspects. A first form of electronic postmark is a series of bytes encoding components of the electronic postmark, including a timestamp, digital signature, and hash of the postmark's data. A second form of the electronic postmark is a Trustmark. A Trustmark is a digital image that encodes that same data, but the data is encoded as image data instead of binary data, as is the case in the first form of the electronic postmark.

When an electronic postmark is created, a recipient of the electronic postmark may receive both the binary version of the electronic postmark and a Trustmark image encoding the same data in image form. The Trustmark image may also be used to validate that data associated with the electronic postmark has not been altered. In some aspects, the recipient may utilize a service application programming interface that receives payload data and a Trustmark image as inputs. An indicator of Trustmark validity may then be returned to the recipient. In some aspects, an error condition may be indicated if the submitted Trustmark is itself invalid (in that information contained within the Trustmark itself is not consistent), or that the payload data submitted with the Trustmark is not properly associated with the Trustmark. In other words, the submitted Trustmark does not authenticate that the accompanying data is an unmodified copy of data used to originally create the Trustmark.

In block 810, an end user 805 receives a Trustmark image. In some aspects, block 810 may be performed as part of step 6 shown in FIG. 2. In block 815, the Trustmark may be saved by the end user 805. For example, the end user 805 may save the Trustmark in a stable data storage. In block 820, the Trustmark is validated. In some aspects, validation of a Trustmark may include validation of not only the Trustmark image itself, but also whether an accompanying set of (payload) data is properly associated with the Trustmark. In other words, whether the Trustmark validates that the accompanying set of data is an unmodified copy of data that was used to originally create the Trustmark. In some aspects, block 820 may utilize a service oriented interface to validate the Trustmark. For example, block 820 may send a request to a service requesting the Trustmark be validated. The request may include image data of the Trustmark itself. The request may also include a copy of payload data. The payload data may be indicated as data the Trustmark validates. Validation of the Trustmark may confirm or reject this indication.

In some aspects, blocks 825*a-e* may represent at least portions of a process used by a web service to validate a Trustmark. In some aspects, block 825 may include receiving a message from block 820. The message may be received from a computer network in some aspects. The message may include a copy of a Trustmark image. The message may also include a copy of payload data, indicated to be validated by the Trustmark. In block 825*a*, embedded data is extracted from the received Trustmark image. For example, in some aspects, the Trustmark image may embed one or more of a transaction identifier, a hash of a payload associated with the Trustmark, a timestamp of when the EPM associated with the Trustmark was created, and a digital signature of data associated with the corresponding electronic postmark. In some aspects, the embedded data may be extracted via an optical character recognition (OCR) process.

In block 825*b*, a hash of the payload data is generated. In block 825*c*, a digital signature is generated based on the embedded transaction id, payload hash, and timestamp extracted from the Trustmark in block 825*a*. The digital signature may be based on a private key and a public key. In some aspects, the public key may be associated with the end user 905. In block 825*d*, the generated digital signature is compared to the digital signature extracted from the Trustmark image in block 825*a*. If the two digital signatures are equivalent, then block 825*d* may determine that the Trustmark image represents a valid Trustmark, in that the Trustmark is at least internally consistent.

Block 825e determines whether the hash of the payload data generated in block 825b is equivalent to the hash included extracted from the Trustmark in block 825. In some aspects, this determination is conditional on whether block 825d determines the Trustmark itself is internally consistent. If the payload hash matches the hash extracted from the Trustmark image, then block 825e may determine that the Trustmark image is properly associated with the payload data hashed in block 825b. In other words, the Trustmark image is proper and authenticates the payload data is unaltered from data used to generate the Trustmark image itself. One or more of the results of the validations performed in blocks 820d-e may then be included in a response message and provided in block 830. For example, in some aspects, block 825e may transmit a network message including one or more indications of whether the Trustmark image is valid and/or whether the payload data included in the request is properly associated with the Trustmark image.

In block 830, the response is interpreted to extract the included indications. If the response indicates the Trustmark image and the accompanying payload is valid, the payload data may be used for subsequent processing. In other words, subsequent processing may rely on the validation of the payload data. For example, valid payload data may be used as a basis for display and/or storage in block 835. If the validation code indicates the Trustmark and/or accompanying payload data is invalid, then the payload data may be rejected in block 840. For example, the payload data may not be used for further processing.

Figure 9:
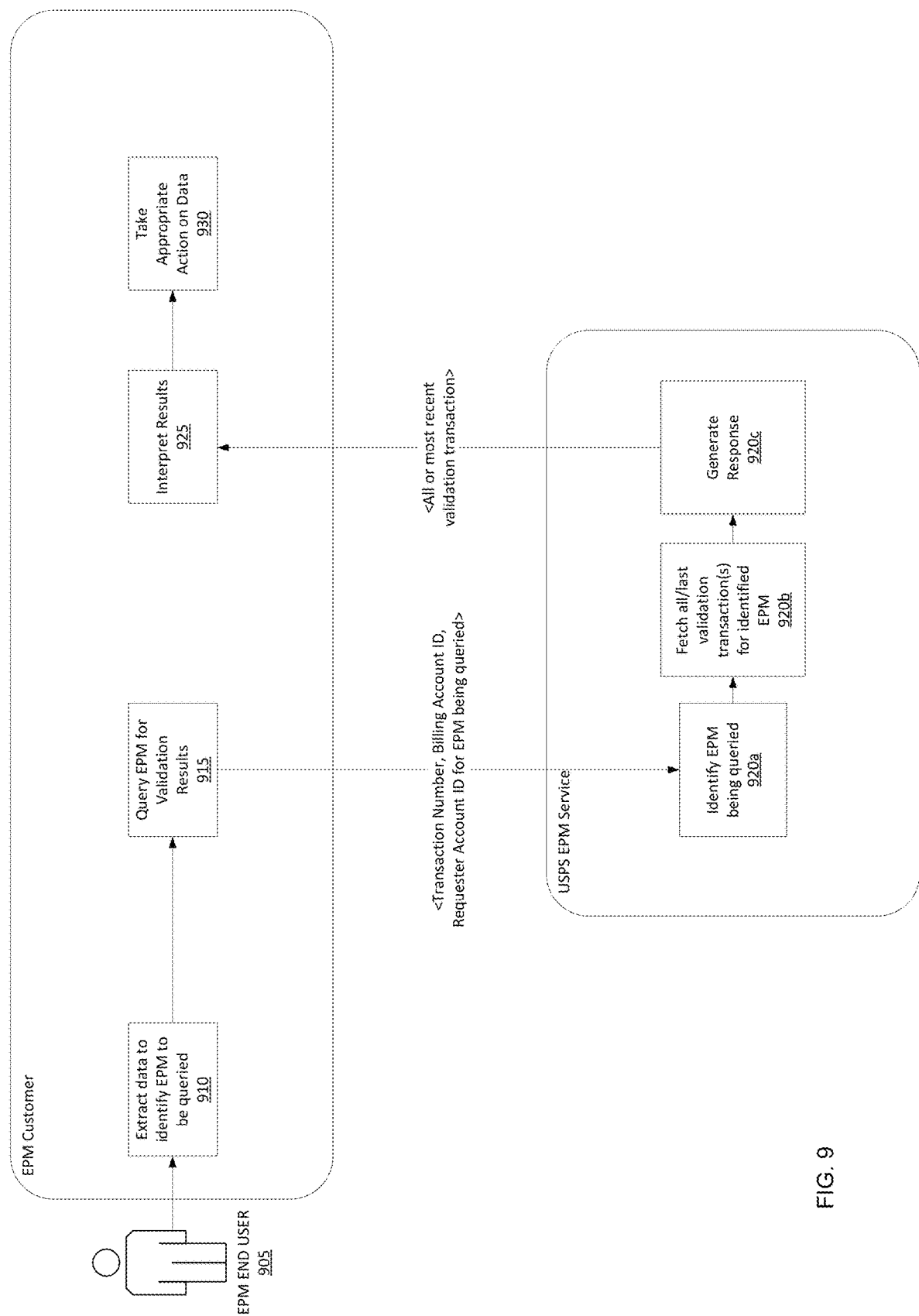
FIG. 9 is a flow chart of a method for querying validation results for an electronic postmark.

FIG. 9 is a flow chart of a method for querying validation results for an electronic postmark. A customer may query for validation requests made for an electronic postmark in order to confirm that the recipient of the postmark received a valid postmark and was able to successfully validate it. The customer may utilize a service API in some aspects. The API may receive as input a transaction number, billing account identifier, and requester account identifier as inputs. The query may then fetch related validation transactions and return either the most recent validation transaction, or a list of validation transactions for the provided EPM. The system may return an error indication if any of the information submitted does not identify a valid electronic postmark or if insufficient data is provided.

In block 910, data that identifies an electronic postmark is identified. In block 915, a query for validation results of the identified postmark is initiated. In some aspects initiating the query may include sending an electronic message to a service oriented interface. For example, in some aspects, the service oriented interface may utilize SOAP or REST technologies. The query, which may be included in the electronic message discussed above, may include data such as a transaction number, billing account identifier, and/or an account number of the requester (EPM end user 805 for example).

In block 920a, the electronic message may be received by a validation query service in some aspects. For example, in some aspects, the electronic message may be a network message, for example, utilizing REST or SOAP technologies to encode the message. An electronic postmark may be identified based on the electronic message. For example, one or more of a transaction number, billing account identifier, and/or a requester account identifier may be used to identify an electronic postmark being queried. For example, the electronic postmark may be identified by querying an internal database that stores an association between one or more of the transaction number, billing account identifier, and/or requester account identifier to identify the electronic postmark being queried.

In block 920b, a list of validation transactions is identified based on the identified postmark. For example, in some aspects, a validation transaction database may be queried for those transactions associated with the identified postmark. In block 920c, a response is generated indicating the identified validation transactions. In some aspects, the response may include data describing the validation transactions. For example, in some aspects, the response may include xml data describing the validation transactions. The response may be transmitted in some aspects over a network to a computer running a process performing block 925. Block 925 may extract data describing the validation transactions from the message. In block 930, appropriate action may be taken based on the results. For example, in some aspects, one or more of the validation transactions associated with the electronic postmark identified in block 920a, and included in the response generated in block 920c, may be displayed on a user interface.

Figure 10:
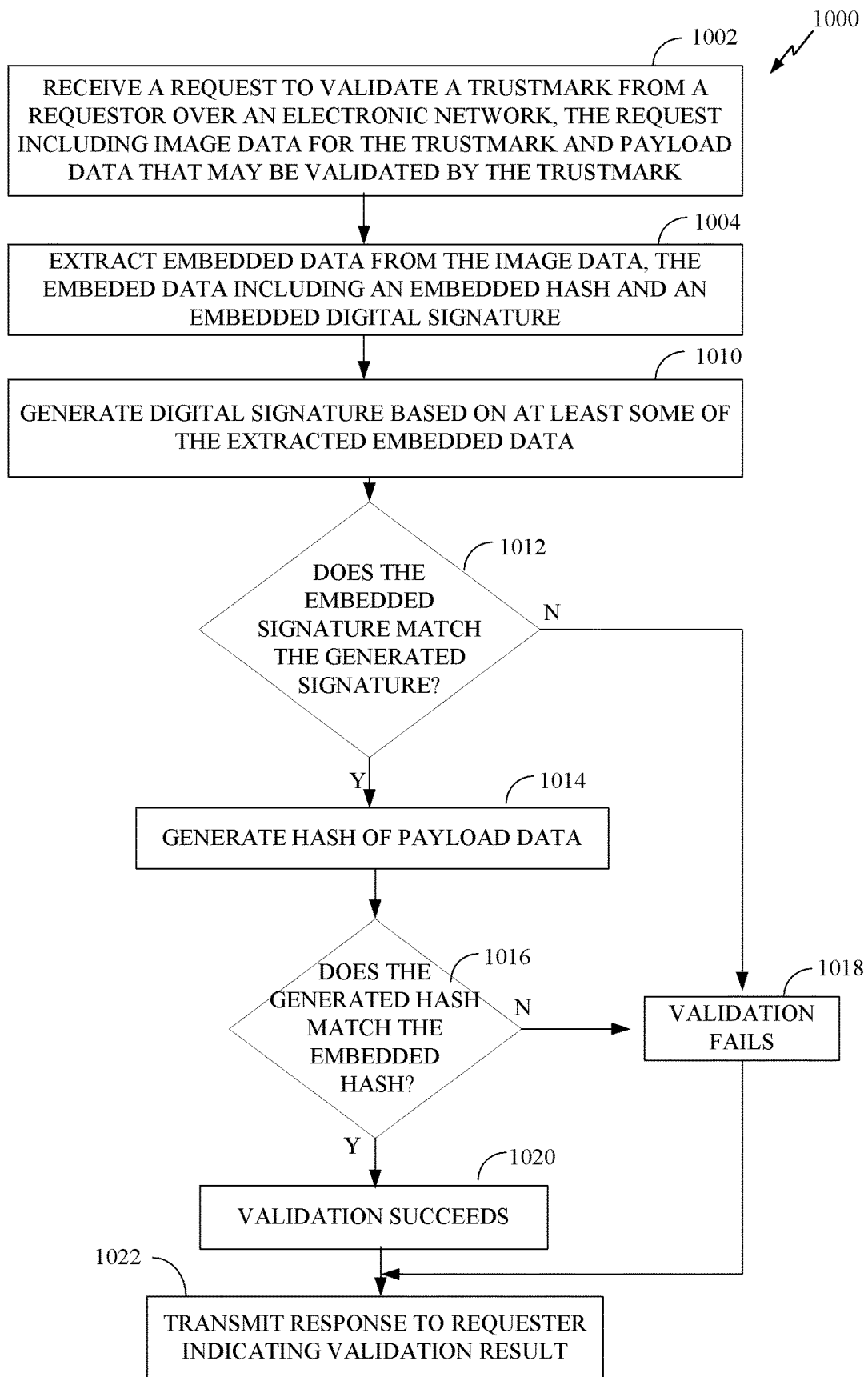
FIG. 10 is a flowchart of a method of validating a Trustmark of an electronic postmark.

FIG. 10 is a flowchart of a method of validating a Trustmark. In some aspects, the process 1000 of FIG. 10 may be performed by the processor 1105 configured by instructions included in the Trustmark validation module 1115, both of which are discussed below with respect to FIG. 11. The process 1000 disclosed with respect to FIG. 10 may allow a user of an electronic postmark to validate whether a particular Trustmark associated with an electronic postmark is valid. The validity may be comprised of two parts in some aspects. First, the Trustmark itself may need to be internally consistent to be considered valid. For example, in some aspects, a digital signature embedded in the Trustmark must properly sign other data embedded in the Trustmark in order for the Trustmark to be considered internally consistent and therefore valid. The other data may include, for example, a transaction identifier. The transaction identifier may identify a particular transaction for a particular customer. For example, the transaction identifier may identify a transaction for which an electronic postmark was created. The Trustmark validated by process 1000 may be associated with that electronic postmark. The other data may also include a hash of payload data validated by the Trustmark. By digitally signing the hash of the payload data, the Trustmark and therefore the electronic postmark ensures that the payload data is unaltered from its original form at the time the electronic postmark was created.

In block 1002, a request to validate a Trustmark from a requester is received over an electronic network. In some aspects, the request may take the form of a web service request, for example, utilizing SOAP or REST technology. The request may indicate image data defining the Trustmark. The request may also include or otherwise indicate payload data that may be validated by the Trustmark. In other words, the request may at least request verification that the indicated Trustmark validates the indicated payload data.

In block 1004, embedded data is extracted from the Trustmark image. The embedded data may include one or more of an embedded digital signature, an embedded hash of payload data validated by the Trustmark, an embedded transaction identifier, and an embedded timestamp for when the embedded digital signature was created.

In block 1010, a digital signature is generated based on at least some of the extracted embedded data. For example, the digital signature may be based on one or more of the embedded transaction identifier, embedded hash, and the embedded timestamp. The digital signature may also be generated based on a public key and/or a private key.

Decision block 1012 determines whether the embedded digital signature matches the generated digital signature. If it does not, process 1000 moves to block 1018, which records that the verification of the Trustmark has failed. If the generated digital signature matches the digital signature embedded in the Trustmark, the process 1000 moves to block 1014.

In block 1014, a hash of the indicated payload data is generated. The generated hash is then compared to the hash that was embedded in the Trustmark in decision block 1016. If the two hashes match, process 1000 moves to block 1020, which indicates that the validation of the Trustmark has succeeded.

Process 1000 moves from either block 1018 or block 1020 to block 1022, which transmits a response to the requester indicating the result of the validation. For example, the response may indicate one or more of the result of validation of the Trustmark itself and the result of the validation of the payload data based on the Trustmark. In the alternative, a single value indicating whether both validations succeeded or at least one of the validations failed may be indicated in the response. In some aspects, the response may embed the results of the validation in XML data included or indicated by the response.

Figure 11:
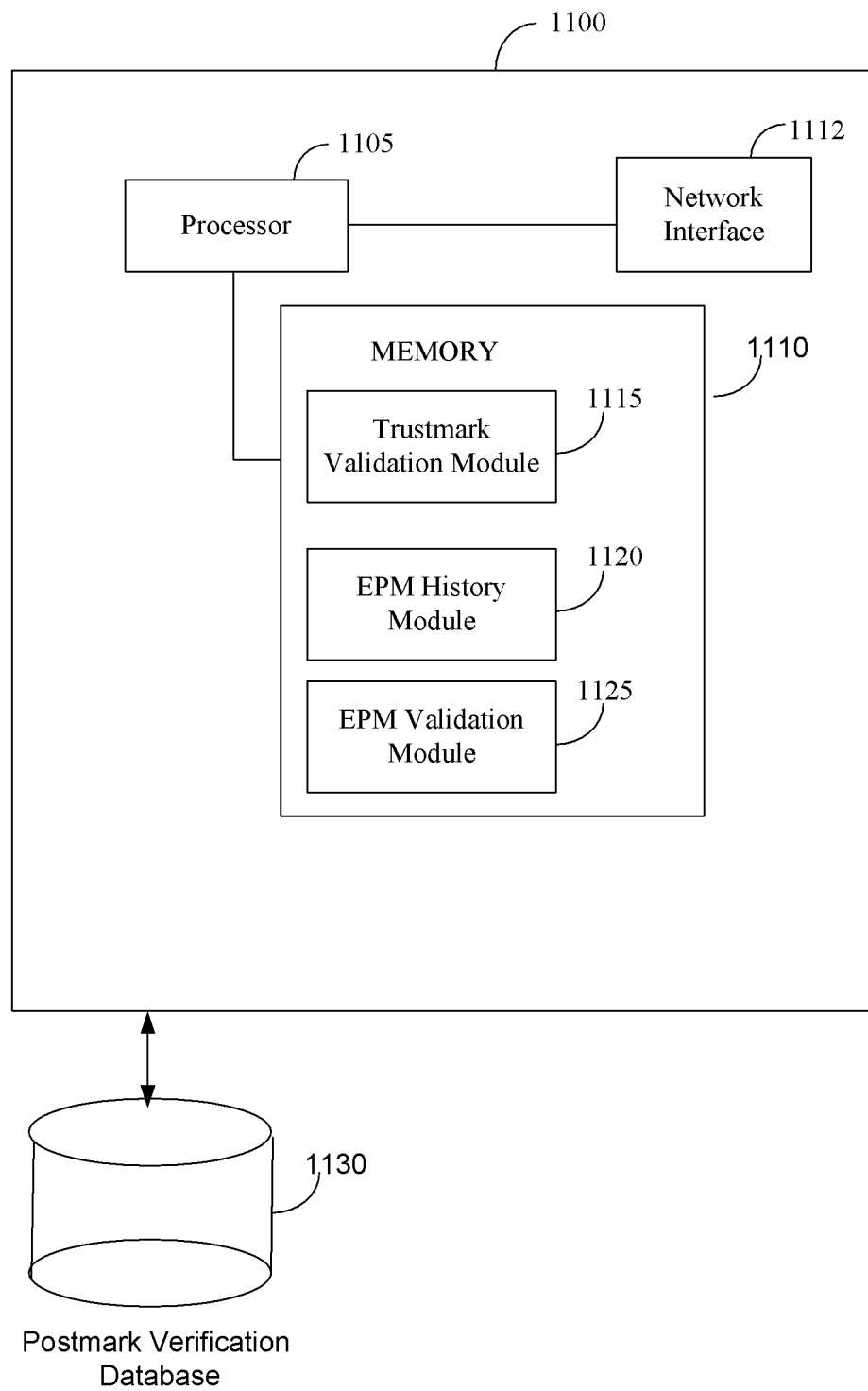
FIG. 11 is a functional block diagram of an apparatus that may be configured to perform one or more of the disclosed embodiments.

FIG. 11 is a functional block diagram of an apparatus that may be configured to perform one or more of the disclosed embodiments. In some aspects, the apparatus 1100 may be integrated with the apparatus 700 disclosed with respect to FIG. 7 and/or the apparatus 500 disclosed with respect to FIG. 5. For example, in some aspects, the integrated apparatus may include a single processor, memory, and network interface. In some aspects, the integrated apparatus may include one or more of the modules described with respect to FIGS. 5, 7 and 11.

The apparatus 1100 includes a processor 1105, memory 1110 operably connected to the processor 1105, and a network interface 1112 that is also operably connected to the processor 1105. The memory 1110 stores instructions that configure the processor 1105 to perform operations. The instructions stored in the memory 1110 are organized into modules. Instructions in the Trustmark Validation Module 1115 may configure the processor 1105 to perform one or more of the functions discussed above with respect to process 1000 of FIG. 10.

Figure 12:
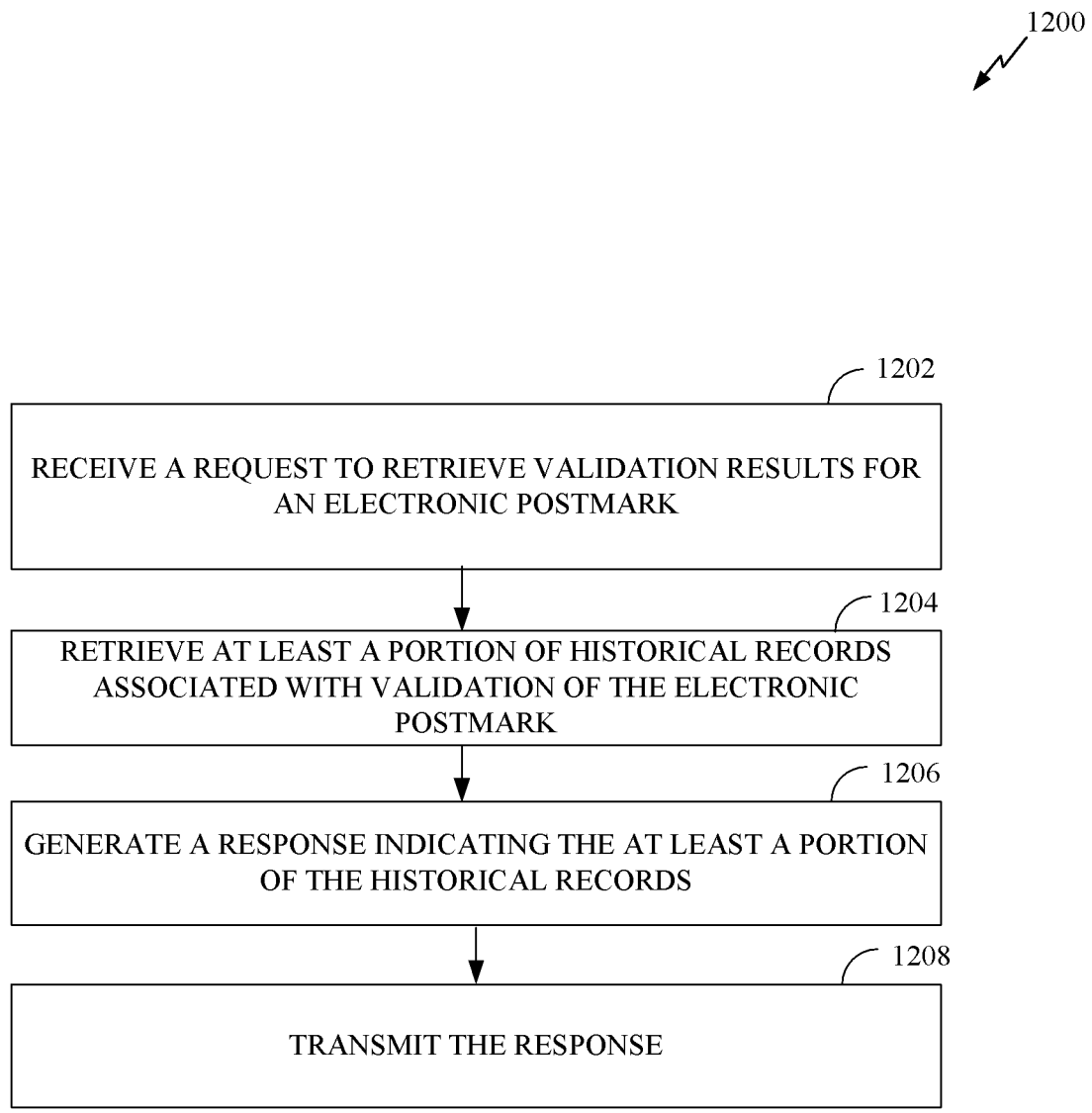
FIG. 12 is a flowchart of a method of retrieving a validation history of an electronic postmark.

FIG. 12 is a flowchart of a method of retrieving validation results for an electronic postmark. In some aspects, method 1200 may be included in the process described with respect to FIG. 9 above. In some aspects, the process 1200 of FIG. 12 may be performed by the processor 1105 configured by instructions included in the EPM history module 1115, both of which are discussed above with respect to FIG. 11. The process 1200 disclosed with respect to FIG. 12 may allow a user of an electronic postmark to validate whether one or more parties have previously requested validation of the electronic postmark. This may function to confirm that a recipient of an electronic postmark has received the electronic postmark and was able to successfully validate it.

In block 1202, a request is received to retrieve validation results for an indicated electronic postmark. In some aspects, the request is received over a computer network. In some aspects, the request utilizes SOAP or REST based interface technologies. In some aspects, the request indicates the electronic postmark to be queried by including or otherwise indicating one or more of a transaction number or identifier, billing account identifier, and a requester account identifier.

The requester account identifier may be a customer account identifier of a party making the request received in block 1202. The billing account identifier may be an account identifier of a party that is financially responsible for the electronic postmark indicated in the request. These parties may be different. The transaction number may, in combination with, for example, the billing account identifier, be an identifier that was associated with the electronic postmark when it was created. That transaction number may have been provided to a requester of the electronic postmark. For example, the transaction number may have been included in the response transmitted in block 430 above.

The transaction number may be used to search an internal database of records relating to electronic postmarks. This internal database may be secured by an entity signing the electronic postmarks.

In block 1204, at least a portion of historical records associated with validation of the electronic postmark may be retrieved. For example, in some aspects, block 1204 may search a database based on one or more of the transaction identifier. In some aspects, the database searched may be a postmark verification database 1130, discussed above with respect to FIG. 11.

In block 1206, a response is generated including or otherwise indicating at least a portion of the historical records associated with validation of the electronic postmark. The response may include data in xml format, with the data indicating the historical records.

In block 1208, the generated response is transmitted. In some aspects, the response may be transmitted over a computer network. The response may utilize either SOAP or restful technologies in some aspects.

Figure 13:
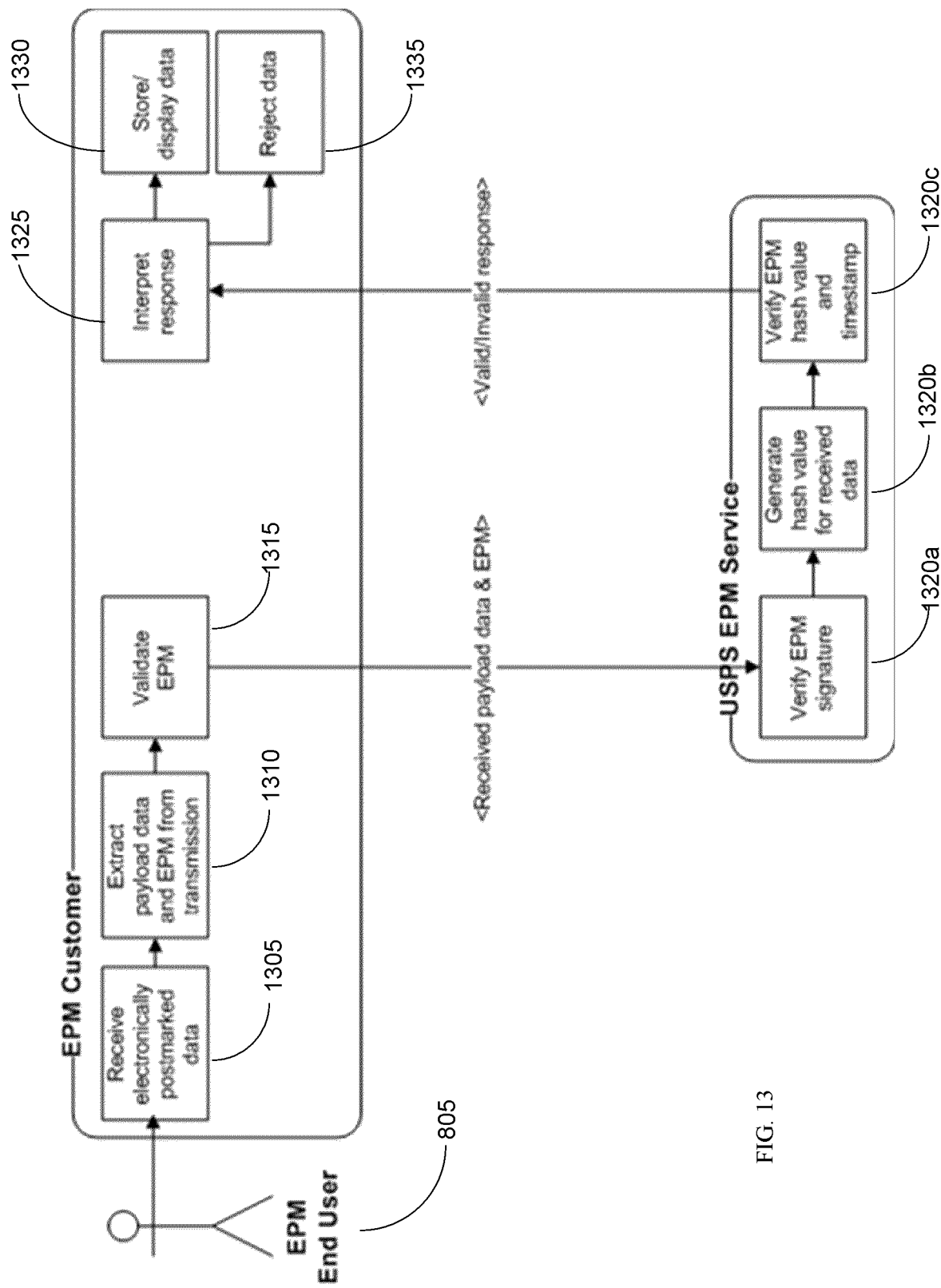
FIG. 13 is a flowchart of a method of validating an electronic postmark in some operative embodiments.

FIG. 13 is a flowchart of a method of validating an electronic postmark. In some aspects, after an electronic postmark is provided to a user, a party may wish to determine whether the electronic postmark is valid. For example, in some aspects, a first party may obtain an electronic postmark and transmit the electronic postmark and data signed by the electronic postmark to a second party, which receives the electronic postmark and the data from the first party. The second party may then determine whether the received data is validated by the received electronic postmark. The method described by FIG. 14 may enable this validation to occur.

In block 1305, a transmission of electronically postmarked data is received. The data may include payload data that may be validated by an electronic postmark. Data defining the electronic postmark may also be included or otherwise indicated in the received transmission. This information is extracted from the transmission in block 1310. In block 1315, a validation of the electronic postmark is initiated. Block 1315 may include generating a message requesting the validation. The message may include or otherwise indicate the payload data and the electronic postmark data. The message may be transmitted to a web service providing validation of electronic postmarks. For example, the message may utilize SOAP or restful interface technologies to encode the request.

Blocks 1320*a-c* describe how the validation of the electronic postmark occurs in some aspects. In block 1320*a*, verification of the electronic postmark signature is performed. In some aspects, block 1320 includes extracting embedded data from the electronic postmark, such as one or more of a timestamp, payload hash, and a transaction identifier. A digital signature may be generated based on the extracted data. The digital signature may also be based on one or more of a public key and private key. If the generated digital signature is equivalent to a digital signature extracted from the electronic postmark, then the electronic postmark is verified by block 1320*a*. Otherwise, the electronic postmark fails the verification.

In block 1320*b*, a hash of the payload data is generated. The generated hash may be compared to the hash extracted from the electronic postmark in block 1320*a*. If the two hashes are equivalent, then this confirms that the electronic postmark authenticates the payload data. Otherwise, the electronic postmark does not validate the payload data. Block 1320*c* may also write information relevant to the verification to a verification database, such as the verification database 1130 discussed above. This information may be utilized by process 1200 when providing a history of validation results for the electronic postmark as described above with respect to FIG. 12.

A result indicating results of the validation is transmitted by block 1320*c* and received by block 1325, which interprets the result. If the validation was successful, the payload data may be used for other purposes in block 1330. For example, information derived from the payload data may be displayed on a user interface of a computer, or used in other application domains. If the validation failed, the payload data may be discarded or otherwise rejected in block 1335, as it may not be trusted for subsequent processing.

Figure 14:
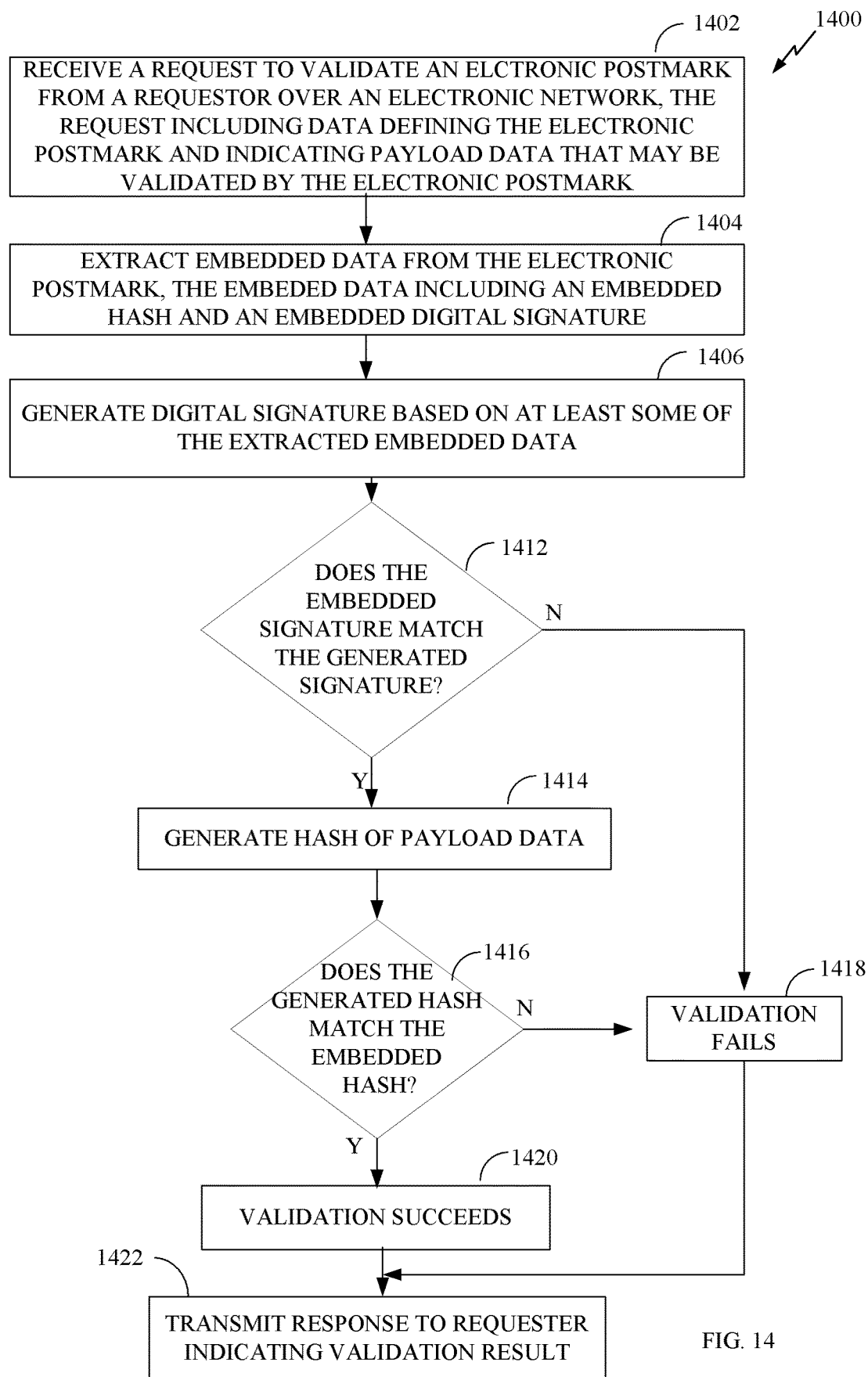
FIG. 14 is a flowchart of a method of validating an electronic postmark in some operative embodiments.

FIG. 14 is a flowchart of a method of validating an electronic postmark and accompanying payload data. In some aspects, the process 1400 of FIG. 14 may be performed by the processor 1105 configured by instructions included in the EPM validation module 1125, both of which are discussed below with respect to FIG. 11. The process 1400 disclosed with respect to FIG. 14 may allow a user of an electronic postmark to validate whether the electronic postmark is valid, and whether payload data included in the request is validated by the electronic postmark. For example, in some aspects, a digital signature embedded in the electronic postmark data must properly sign other data included in the electronic postmark in order for the electronic postmark to be considered internally consistent and therefore valid. The other data may include, for example, a transaction identifier. The transaction identifier may identify a particular transaction for a particular customer. For example, the transaction identifier may identify a transaction for which the electronic postmark was created. The other data may also include a hash of payload data validated by the Trustmark. By digitally signing, at least in part, the hash of the payload data, the electronic postmark provides a signal as to whether the payload data is unaltered from its original form at the time the electronic postmark was created, and thus whether the indicated electronic postmark properly authenticates the indicated payload data.

In block 1402, a request to validate an electronic postmark from a requester is received over an electronic network. In some aspects, the request may take the form of a web service request, for example, utilizing SOAP or REST technology. The request may indicate digital data defining the electronic postmark. The request may also include or otherwise indicate payload data that may be validated by the defined electronic postmark. In other words, the request may at least request verification that the indicated electronic postmark validates the indicated payload data.

In block 1404, embedded data is extracted from the indicated electronic postmark. The embedded data may include one or more of an embedded digital signature, an embedded hash of payload data validated by the electronic postmark, an embedded transaction identifier, and an embedded timestamp for when the embedded digital signature was created.

In block 1406, a digital signature is generated based on at least some of the extracted embedded data. For example, the digital signature may be based on one or more of the embedded transaction identifier, embedded hash, and the embedded timestamp. The digital signature may also be generated based on a public key and/or a private key.

Decision block 1412 determines whether the embedded digital signature matches the generated digital signature. If it does not, process 1400 moves to block 1418, which records that the verification of the electronic postmark has failed. In some aspects, block 1418 may write a record recording the result of the verification to an electronic postmark verification database, such as verification database 1130 discussed below with respect to FIG. 11. If the generated digital signature matches the digital signature embedded in the electronic postmark, the process 1400 moves to block 1414.

In block 1414, a hash of the indicated payload data is generated. The generated hash is then compared to the hash that was extracted from the electronic postmark in decision block 1416. If the two hashes match, process 1400 moves to block 1420, which indicates that the validation of the electronic postmark has succeeded. Block 1420 may also write a record to a database recording the results of the validation. In some aspects, this record may be written to the verification database 1130, discussed above with respect to FIG. 11.

Process 1400 moves from either block 1418 or block 1420 to block 1422, which transmits a response to the requester indicating the result of the validation. For example, the response may indicate one or more of the result of validation of the electronic postmark itself and the result of the validation of the payload data based on the electronic postmark. In the alternative, a single value indicating whether both validations succeeded or at least one of the validations failed may be indicated in the response. In some aspects, the response may embed the results of the validation in XML data included or indicated by the response.

Those of skill will recognize that the various illustrative logical blocks, modules, circuits, and algorithm steps described as follows, and in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and writes information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A method of generating an electronic postmark, comprising:
    receiving, via a server hardware computer, a request message from an electronic network, the request message comprising request data;
    parsing the request data;
    identifying, from parsing the request data, payload data and metadata, the payload data comprising data to be authenticated by the electronic postmark;
    generating via the server hardware computer, a timestamp in response to receiving the request message;
    hashing the payload data to transform the payload data into a payload hash;
    creating, in a memory, a new data structure corresponding to the electronic postmark, the new data structure comprising:
        a binary message including the payload hash; and
        a digital image of an identifier of the electronic postmark, the digital image encoding at least a portion of the request data;
    digitally signing the new data structure with a digital signature;
    storing the new data structure in a datastore, wherein the stored new data structure comprises the metadata in a metadata field, the payload hash in a payload hash field, the timestamp in a timestamp field, and the digital signature in a digital signature field;
    generating a response message, the response message comprising the binary message and the digital image; and
    transmitting, via the server hardware computer, the response message onto the electronic network.

2. The method of claim 1, wherein the metadata comprises one or more of a category of the payload data, a recipient of the payload data, an origin of the payload data, a provider identifier and a mailer identifier.

3. The method of claim 2, further comprising associating the metadata, the payload hash, the timestamp, and the digital signature as a record, and storing the record in a database.

4. The method of claim 1, wherein the payload data comprises a direct protocol message.

5. The method of claim 1, wherein the payload data comprises an email message.

6. The method of claim 1, wherein parsing the request data comprises one or more of decrypting the request data to identify the payload data and the metadata or identifying a username and password in the request data.

7. An apparatus for generating an electronic postmark, comprising:
    an electronic hardware memory configured to store instructions; and
    an electronic hardware processor operably connected to the electronic hardware memory and configured to execute the instructions to:
        receive a request message from an electronic network, the request message comprising request data including payload data and meta data;
        parse the request data to identify payload data and metadata, the payload data comprising data authenticated by the electronic postmark;
        generate a timestamp in response to receiving the request message;
        hash the payload data to transform the payload data into a payload hash;
        create, in the electronic memory, a new data structure corresponding to the electronic postmark, the new data structure comprising:
            a binary message including the payload hash; and
            a digital image of an identifier of the electronic postmark, the digital image encoding at least a portion of the request data;
        digitally sign the new data structure with a digital signature;
        store the new data structure in a datastore, wherein the stored new data structure comprises the metadata in the metadata field, the payload hash in the payload hash field, the timestamp in the timestamp field, and the digital signature in the digital signature field;
        generate a response message, the response message comprising the binary message and the digital image, and
        transmit the response message onto the electronic network.

8. The apparatus of claim 7, wherein the service oriented architecture module is further configured to cause the electronic hardware processor to decode one or more of a category of the payload data, a recipient of the payload data, an origin of the payload data, a provider identifier and a mailer identifier from the metadata.

9. The apparatus of claim 8, wherein the wherein the processor further executes the instructions to associate the metadata, the payload hash, the timestamp, and the digital signature as a record, and store the record in a database.

10. The apparatus of claim 8, wherein the electronic hardware processor is further configured to query the database for records with metadata provider identifiers equivalent to a particular value.

11. The apparatus of claim 7, wherein the payload data comprises a direct protocol message.

12. The apparatus of claim 7, wherein the payload data comprises an email message.

13. The apparatus of claim 7, wherein the processor further executes the instructions to generate the request message to include at least one of a requester account identifier and a billing account identifier.

* * * * *